(12) United States Patent
Dien

(10) Patent No.: US 9,653,943 B2
(45) Date of Patent: May 16, 2017

(54) POWER MANAGEMENT APPARATUS

(76) Inventor: Ghing-Hsin Dien, Taipei (TW)

( * ) Notice: Subject to any disclaimer, the term of this patent is extended or adjusted under 35 U.S.C. 154(b) by 596 days.

(21) Appl. No.: 14/342,390

(22) PCT Filed: Sep. 9, 2011

(86) PCT No.: PCT/CN2011/079513
§ 371 (c)(1),
(2), (4) Date: Mar. 2, 2014

(87) PCT Pub. No.: WO2013/033912
PCT Pub. Date: Mar. 14, 2013

(65) Prior Publication Data
US 2014/0232193 A1    Aug. 21, 2014

(51) Int. Cl.
*H02J 1/12*    (2006.01)
*H02J 7/34*    (2006.01)
*H02M 1/34*    (2007.01)
*H02J 7/00*    (2006.01)

(52) U.S. Cl.
CPC ................ *H02J 7/34* (2013.01); *H02M 1/34* (2013.01); *H02J 7/0029* (2013.01); *H02J 7/345* (2013.01); *H02J 2007/0037* (2013.01); *H02M 2001/342* (2013.01); *Y02B 40/90* (2013.01); *Y02B 70/1491* (2013.01); *Y10T 307/516* (2015.04)

(58) Field of Classification Search
CPC .... H02J 7/34; H02J 2007/0037; H02J 7/0029; H02J 7/345; H02M 1/34; H02M 2001/342; Y02B 40/90; Y02B 70/1491; Y10T 307/516
USPC ......................................................... 307/46
See application file for complete search history.

(56) References Cited

U.S. PATENT DOCUMENTS 6,058,030 A * 5/2000 Hawkes ................ H02M 3/156
                                                     323/268

FOREIGN PATENT DOCUMENTS

| CN | 101615843 A | 12/2009 |
|----|-------------|---------|
| CN | 101685984 A | 3/2010  |
| JP | 10-257683 A | 9/1998  |

* cited by examiner

*Primary Examiner* — Richard Tan
(74) *Attorney, Agent, or Firm* — Cheng-Ju Chiang

(57) ABSTRACT

A power management apparatus cooperates with a controlled apparatus and is electrically connected to a power system. The power management apparatus includes an energy storing module, a switching module and a comparing module. The energy storing module is electrically connected to the controlled apparatus, and the switching module is electrically connected to the energy storing module. The comparing module is electrically connected to the switching module and receives a detection signal. The comparing module generates a periodic signal to control the switching module according to the detection signal. The energy storing module stores an electric energy during a cycle of the periodic signal and releases the electric energy during other cycle after the said cycle. Thereby, the power management apparatus is capable of effectively protecting the controlled apparatus, avoiding the waste of the power, and storing and using extra power.

38 Claims, 24 Drawing Sheets

US 9,653,943 B2

POWER MANAGEMENT APPARATUS

BACKGROUND OF THE INVENTION

Field of Invention

The invention relates to a power management apparatus.

Related Art

FIG. 1A shows a conventional power management apparatus 1A, which cooperates with a power system $P_1$ and a battery unit BAT. The power management apparatus 1A is connected with the battery unit BAT in parallel and includes a resistance R, a switch SW and a comparing circuit C.

The battery unit BAT is charged by the power provided by the power system $P_1$. When detecting that the battery unit BAT achieves a predetermined voltage value, the comparing circuit C will turn on the switch SW, and therefore the current will flow through the resistance R so that the battery unit BAT can be protected from the overcharge situation.

FIG. 1B shows another conventional power management apparatus 1B, which cooperates with a power system $P_1$ and a light emitting unit L. The power management apparatus 1B is connected to the light emitting unit L in parallel. The power management apparatus 1B is a Zener diode and the light emitting unit is a light emitting diode.

The light emitting unit L emits light according to the power provided by the power system $P_1$. When the damage of the light emitting unit L leads to an open circuit and the voltage across the light emitting unit L exceeds the breakdown voltage of the power management apparatus 1B, the current is shunted to flow through the power management apparatus 1B so that the other light emitting unit L can still be assured of a normal operation.

The management scheme of the power management apparatus 1A is to consume extra charging power by the resistance R, and the power management apparatus 1B will also consume the power provided by the power system $P_1$ when acting as a part of the flowing path of the power. In other words, the conventional power management apparatuses 1A and 1B will cause a large waste of the power, so they can't meet the present requirements of green environmental protection.

Therefore, it is an important subject to provide a power management apparatus that can effectively protect the controlled apparatus, avoid the waste of the power, and store and reuse the extra power.

SUMMARY OF THE INVENTION

An objective of the invention is to provide a power management apparatus that can effectively protect the controlled apparatus, avoid the waste of the power, and store and reuse the extra power.

The invention can be realized by the following techniques.

A power management apparatus of the invention cooperates with a controlled apparatus and is electrically connected to a power system. The power management apparatus includes an energy storing module, a switching module and a comparing module. The energy storing module is electrically connected to the controlled apparatus, and the switching module is electrically connected to the energy storing module. The comparing module is electrically connected to the switching module and receives a detection signal. The comparing module generates a periodic signal to control the switching module according to the detection signal. The energy storing module stores an electric energy during a cycle of the periodic signal and releases the electric energy during other cycle after the said cycle.

In one embodiment, the detection signal is a current value or a voltage value representing the state of the controlled apparatus.

In one embodiment, the energy storing module includes a first connection end and a second connection end, the switching module includes an energy releasing end that is electrically connected to an external energy storing element, an external power, an external loading or the power system.

In one embodiment, the power management apparatus further comprises a current detecting element that is connected with the controlled apparatus in series between the first connection end and the second connection end and outputs the detection signal.

In one embodiment, the energy storing module comprises a first energy storing element, a first rectifying element and a second energy storing element. One end of the first energy storing element is electrically connected to the first connection end and the other end of the first energy storing element is connected to the switching module. One end of the first rectifying element is electrically connected to the first energy storing element and the switching module. The second energy storing element is electrically connected to the first rectifying element and the switching module.

In one embodiment, the first energy storing element is an inductor and the second energy storing element is a capacitor.

In one embodiment, the switching module comprises a first switching element and a second switching element. The first switching element is electrically connected to the first energy storing element and the second connection end. The second switching element is electrically connected to the second energy storing element and the energy releasing end.

In one embodiment, one end of the second energy storing element is electrically connected to the second connection end.

In one embodiment, each cycle of the periodic signal includes a turn-on period and a cut-off period.

In one embodiment, electric energy is stored by the first energy storing element through the first switching element during the turn-on period of one cycle of the periodic signal, and released through the first rectifying element and stored by the second energy storing element during the cut-off period of the said cycle, and then released by the second energy storing element through the second switching element during the turn-on period of other cycle after the said cycle.

In one embodiment, each of the first and second switching elements is a semiconductor switching element.

In one embodiment, the first energy storing element and the first switching element form an energy storing path, and the second energy storing element and the second switching element form an energy releasing path.

In one embodiment, the comparing module comprises a comparator, which is electrically connected to the first switching element and outputs the periodic signal to control the first switching element and the second switching element according to the detection signal and a reference signal.

In one embodiment, the energy storing module further comprises a second rectifying element and a third rectifying element. One end of the second rectifying element is electrically connected to one end of the second energy storing element and the other end of the second rectifying element is electrically connected to the second connection end. One end of the third rectifying element is electrically connected to one end of the second energy storing element and the other end of the third rectifying element is electrically connected to the external energy storing element, the external power, the external loading or the power system.

In one embodiment, the first energy storing element and the first rectifying element form an energy releasing path, and the second energy storing element and the second rectifying element form an energy storing path.

In one embodiment, the third rectifying element, the second energy storing element and the second switching element form an energy releasing path.

In one embodiment, the comparing module comprises a comparator, which is electrically connected to the first switching element and outputs the periodic signal to control the first switching element and the second switching element according to the detection signal and a reference signal.

In one embodiment, the reference signal is a voltage signal or a sawtooth-wave voltage signal related to the characteristic of the controlled apparatus.

In one embodiment, the comparing module comprises a digital control circuit, which is electrically connected to the first switching element, converts the detection signal into a digital signal, and compares the digital signal and a predetermined value to output the periodic signal to control the first and second switching elements according to the comparing result.

In one embodiment, the digital control circuit is a microcontroller.

In one embodiment, the digital control circuit has a data communication signal to communicate with the power system.

In one embodiment, the digital control circuit further includes an environment-state signal input end, which is connected to an external environment detector and receives an environment-state signal including environment temperature or humidity information related to the controlled apparatus.

In one embodiment, the external environment detector is a thermistor.

In one embodiment, the data communication signal includes an operation information of the power management apparatus, and the operation information includes voltage value, current value, voltage variation or current variation detected by the detection signal, or frequency, duration of the turn-on period, duration of the cut-off period of the periodic signal, or environment parameters detected by the environment-state signal, or the data information derived from the above parameters.

In one embodiment, the power management apparatus further comprises at least one first switching element, at least one second switching element and a control unit. The first switching element is connected to the controlled apparatus in series to form a series circuit. The second switching element is electrically connected to the series circuit and provides a charging path or a discharging path when the first switching element is cut off. The control unit is electrically connected to the controlled apparatus, the first switching element and the second switching element, and outputs a first control signal to the first switching element or outputs a second control signal to the second switching element according to a controlled-apparatus-state signal or a control communication signal.

In one embodiment, the power management apparatus further comprises at least one first switching unit, at least one second switching unit and a control unit. The first switching unit is connected to the controlled apparatus in series to form a series circuit. The second switching unit is electrically connected to the series circuit and provides a charging path or a discharging path when the first switching unit is cut off. The control unit is electrically connected to the controlled apparatus, the first switching unit and the second switching unit, and outputs a first control signal to the first switching unit or outputs a second control signal to the second switching unit according to a controlled-apparatus-state signal or a control communication signal.

In one embodiment, the second switching unit is electrically connected to the controlled apparatus, the power system, the grounding end of the power system or another controlled apparatus.

In one embodiment, each of the first control signal and the second control signal includes a charging control signal, a discharging control signal, or their combination.

In one embodiment, each of the first and second switching units is a semiconductor switching element.

In one embodiment, the controlled-apparatus-state signal is a current value or a voltage value representing the discharging state or charging state of the controlled apparatus.

In one embodiment, the control unit determines whether the controlled apparatus is chargeable or dischargeable according to the controlled-apparatus-state signal, and outputs the first control signal to cut off the first switching unit and outputs the second control signal to turn on the second switching unit when the determination result is negative.

In one embodiment, the control unit is a comparator, which compares the controlled-apparatus-state signal and a predetermined value and outputs the first control signal or the second control signal according to the comparing result.

In one embodiment, when there are a plurality of the first switching units or second switching units, the control unit outputs the first control signals of different levels to the first switching unit or outputs the second control signals of different levels to the second switching unit.

In one embodiment, the control unit is a digital control circuit, converts the controlled-apparatus-state signal into a digital signal, and compares the digital signal and a predetermined value to output the first control signal or second control signal according to the comparing result.

In one embodiment, the digital control circuit is a microcontroller.

In one embodiment, the digital control circuit has a control communication signal end and receives the control communication signal.

In one embodiment, the digital control circuit has an environment-state signal input end, which is connected to an external environment detector, and the environment-state signal includes environment temperature or humidity information related to the controlled apparatus.

In one embodiment, the external environment detector is a thermistor.

In one embodiment, the control communication signal includes an operation information of the power management apparatus, and the operation information includes a voltage value, current value, voltage variation or current variation detected by the controlled-apparatus-state signal, or environment parameters detected by the environment-state signal, or the data information derived from the above parameters, or the state information of the first or second control signal, or the remotely inputted information for controlling the first control signal or the second control signal.

In one embodiment, the control unit is a signal converter, receives the control communication signal and outputs the first control signal or the second control signal.

In one embodiment, the controlled apparatus includes a loading, a secondary battery, a light emitting diode, an electric double-layer capacitor, a photovoltaic cell or an assembly capable of storing energy and discharging, each of which requires current or voltage protection or control.

In one embodiment, the power system further comprises a current source and a rectifying element. The current source is electrically connected to the controlled apparatus and the energy storing module. The rectifying element is electrically connected to the current source in parallel.

As mentioned above, in the power management apparatus of the invention, the comparing module generates a periodic signal to control the switching module according to the detection signal so that the energy storing module can store energy during a cycle of the periodic signal and release the energy during other cycle. Thereby, the power management apparatus of the invention is capable of effectively protecting the controlled apparatus, avoiding the waste of the power, and storing and using the extra power.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
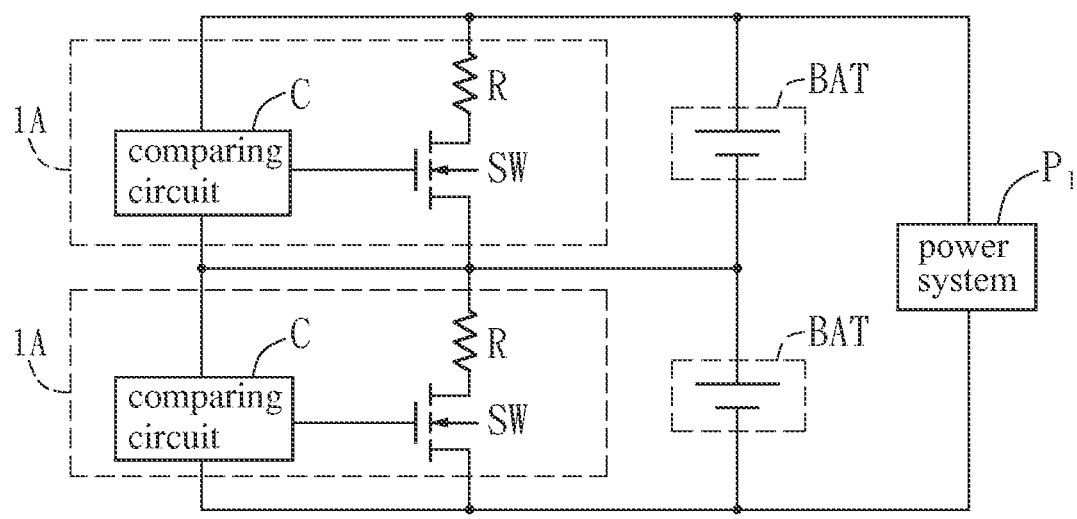
FIG. 1A shows a conventional power management apparatus.
Figure 1B:
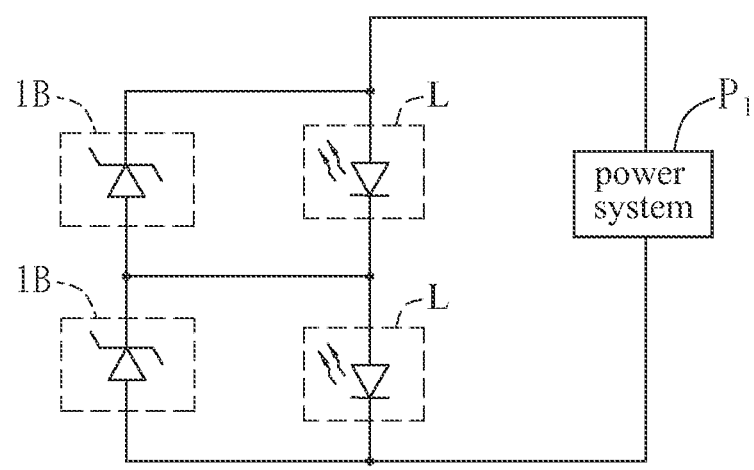
FIG. 1B shows another conventional power management apparatus.
Figure 2:
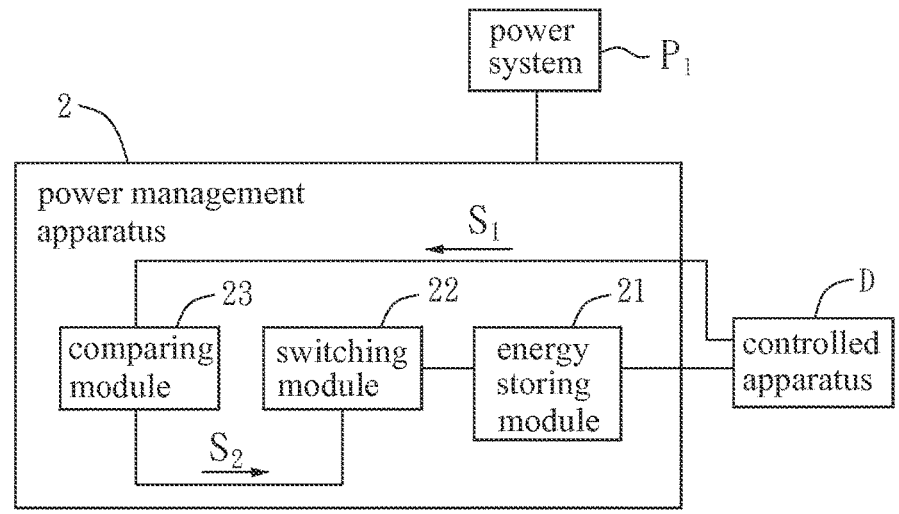
FIG. 2 is a schematic diagram of a power management apparatus according to an embodiment of the invention.

FIG. 2 is a schematic diagram of a power management apparatus 2 according to an embodiment of the invention. As shown in FIG. 2, the power management apparatus 2 cooperates with a controlled apparatus D and is electrically connected to a power system $P_1$. The power system $P_1$ provides power for the controlled apparatus D. The power management apparatus 2 can be connected with the controlled apparatus D in serial or in parallel. As an embodiment, the controlled apparatus D includes a loading, a secondary battery, a light emitting diode, an electric double-layer capacitor, a photovoltaic cell or an assembly capable of storing energy and discharging, each of which requires current or voltage protection or control.

The power management apparatus 2 includes an energy storing module 21, a switching module 22 and a comparing module 23. The energy storing module 21 is electrically connected to the controlled apparatus D, and the switching module 22 is electrically connected to the energy storing module 21. The comparing module 23 is electrically connected to the switching module 22 and receives a detection signal $S_1$. The detection signal $S_1$ is a signal representing the voltage value related to the controlled apparatus D or representing the current value flowing through the controlled apparatus D. The comparing module 23 generates a periodic signal $S_2$ to control the switching module 22 according to the detection signal $S_1$. The energy storing module 21 stores an electric energy during a cycle of the periodic signal $S_2$ and releases the electric energy during other cycle after the said cycle.

The energy storing module 21 can release all the energy during a single cycle after the said cycle or distributedly release during several cycles after the said cycle. Besides, as an embodiment, new energy storing and old energy releasing can be performed within one cycle, and the periodic signal $S_2$ can have fixed cycle ratio or unfixed cycle ratio. In other words, the ratio of the turn-on period to the cut-off period of each of the cycles of the periodic signal $S_2$ is adjustable.

Figure 3:
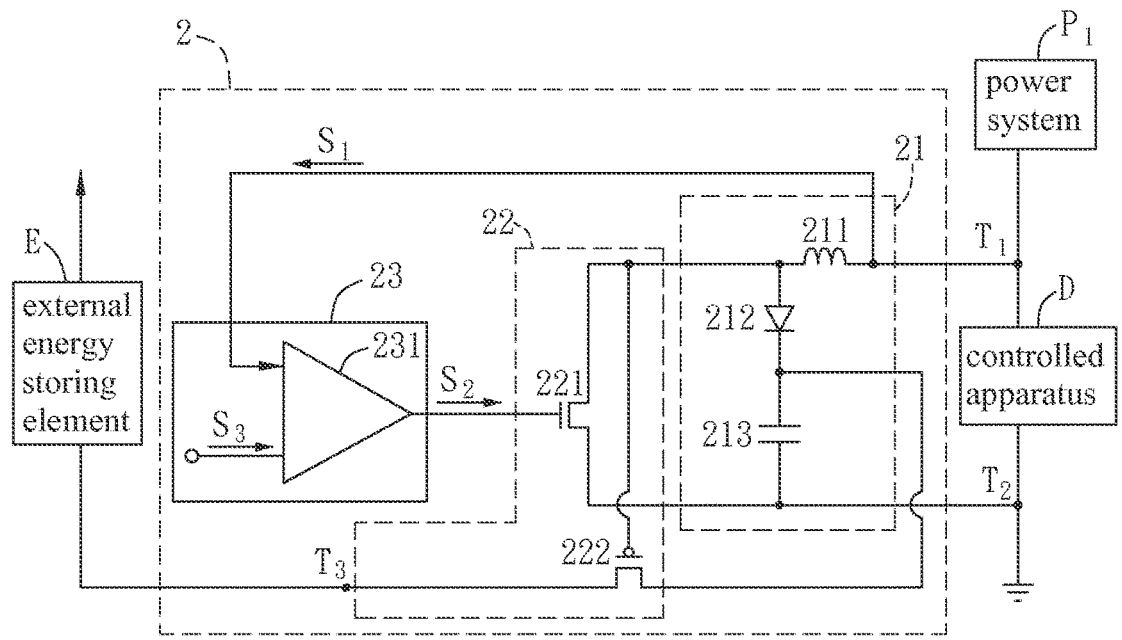
FIG. 3 is another schematic diagram of the power management apparatus according to an embodiment of the invention.

FIG. 3 is another schematic diagram of the power management apparatus 2 according to an embodiment of the invention. As shown in FIG. 3, the energy storing module 21 includes a first connection end $T_1$, a second connection end $T_2$, a first energy storing element 211, a first rectifying element 212 and a second energy storing element 213. The energy storing module 21 is connected with the controlled apparatus D in parallel through the first and second connection ends $T_1$ and $T_2$. One end of the first energy storing element 211 is electrically connected to the first connection end $T_1$ and the other end of the first energy storing element 211 is connected to the switching module 22. One end of the first rectifying element 212 is electrically connected to the first energy storing element 211 and the switching module 22. One end of the second energy storing element 213 is electrically connected to the first rectifying element 212 and the switching module 22, and the other end of the second energy storing element 213 is electrically connected to the second connection end $T_2$. The first energy storing element 211 is an inductor and the second energy storing element 213 is a capacitor.

The switching module 22 includes an energy releasing end $T_3$, a first switching element 221 and a second switching element 222. The first switching element 221 is electrically connected to the first energy storing element 211 and the second connection end $T_2$. The second switching element 222 is electrically connected to the second energy storing element 213 and the energy releasing end $T_3$. The energy releasing end $T_3$ is electrically connected to an external energy storing element E. As an embodiment, each of the first and second switching elements 221 and 222 is a semiconductor switching element, such as bipolar junction transistor (BJT) or field-effect transistor (FET).

Besides being a terminal of a transmission line as shown in FIG. 3, the energy releasing end $T_3$ also can include a rectifying element, such as a diode. Moreover, the external energy storing element E can include a capacitor, inductor, battery cell or their combination for example. The energy releasing end $T_3$ also can be electrically connected to an external energy storing element E, an external power, an external loading or their combination, and also can be electrically connected to the power system $P_1$.

Figure 4A:
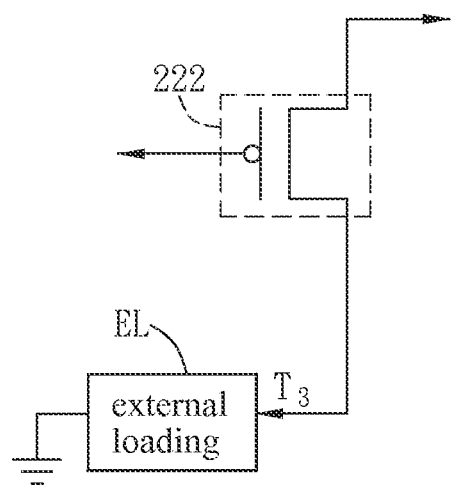
FIGS. 4A to 4D are schematic diagrams showing some variations of the energy releasing end, the external loading, the external power, and the external energy storing element according to an embodiment of the invention
Figure 4B:
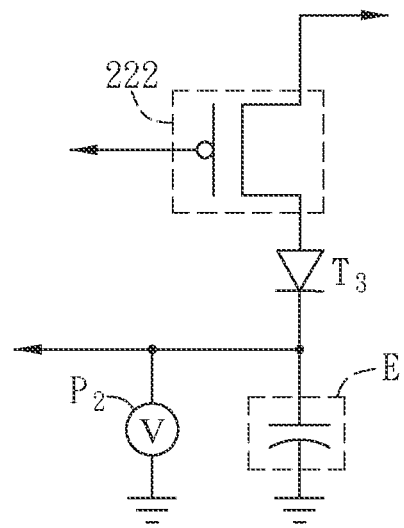
Figure 4C:
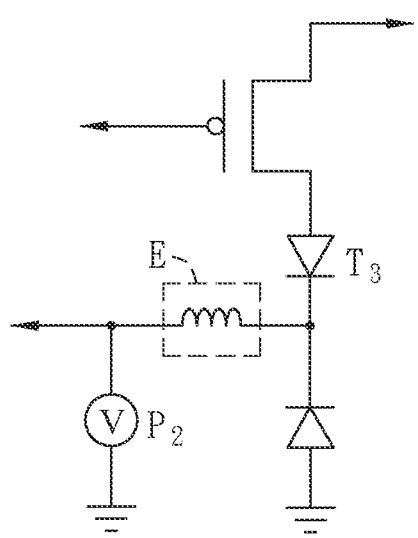
Figure 4D:
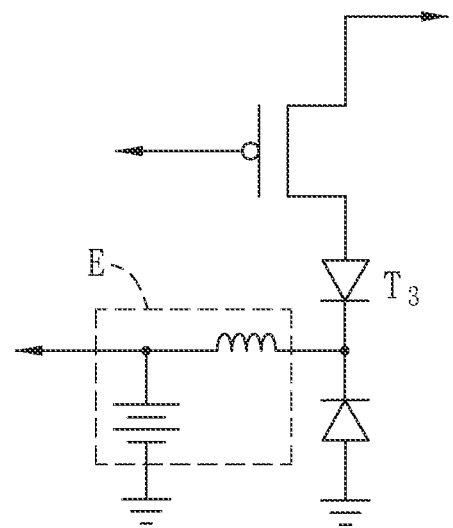

FIGS. 4A to 4D are schematic diagrams showing some variations of the energy releasing end $T_3$, the external loading EL, the external power $P_2$, and the external energy storing element E according to an embodiment of the invention. As shown in FIG. 4A, the energy releasing end $T_3$ is a terminal of a transmission line and connected to the external loading EL to transmit extra power to the external loading EL to drive or operate the external loading EL. As shown in FIG. 4B, the energy releasing end $T_3$ includes a diode and is connected to the external power $P_2$ and the external energy storing element E, and the external energy storing element E is a capacitor for example. As shown in FIG. 4C, the energy releasing end $T_3$ includes a diode and is connected to the external power $P_2$ and the external energy storing element E, and the external energy storing element E is an inductor for example. As shown in FIG. 4D, the energy releasing end $T_3$ includes a diode and is connected to the external energy storing element E, and the external energy storing element E is composed of an inductor and a battery for example.

As shown in FIG. 3, the comparing module 23 includes a comparator 231, which is electrically connected to the first switching element 221 and outputs the periodic signal $S_2$ to control the first switching element 221 and the second switching element 222 according to the detection signal $S_1$ and a reference signal $S_3$. As an embodiment, the comparing module 23 includes a digital control circuit, such as a microcontroller. The reference signal $S_3$ could be a voltage signal or a sawtooth-wave voltage signal related to the characteristic and state of the controlled apparatus D, and could be variable according to the characteristic and state of the controlled apparatus D.

Figure 5A:
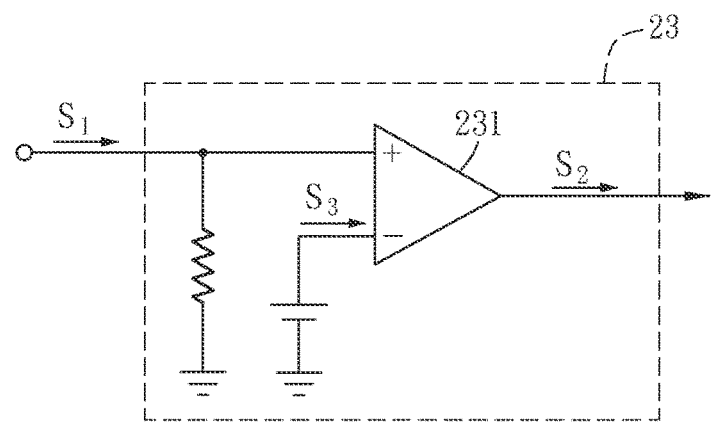
FIGS. 5A to 5F are schematic diagrams of some variations of the comparing module according to an embodiment of the invention.
Figure 5B:
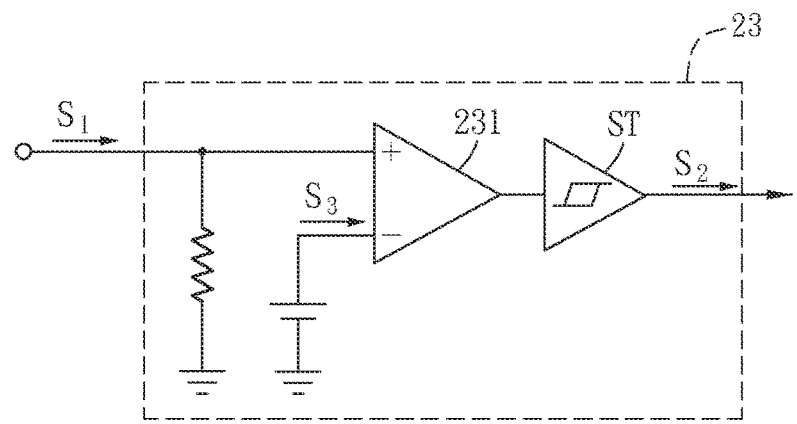
Figure 5C:
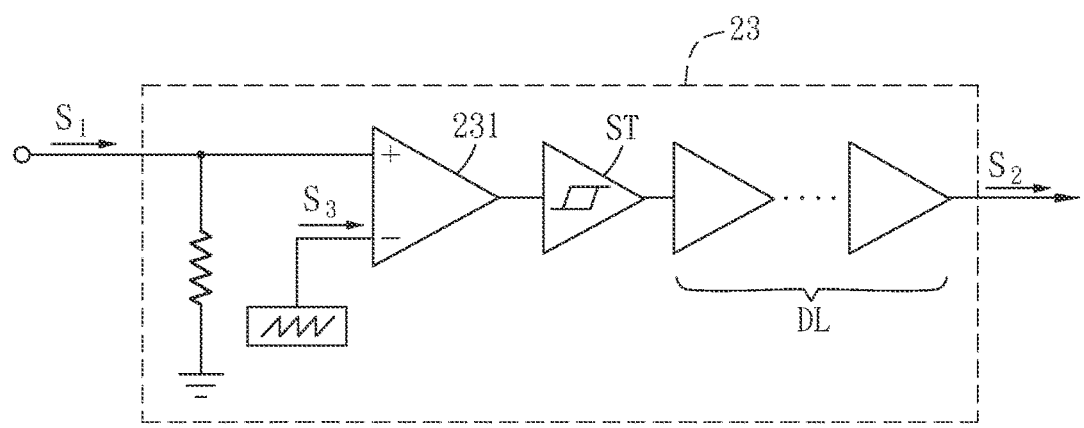

FIGS. 5A to 5F are schematic diagrams of some variations of the comparing module 23 according to an embodiment of the invention. As shown in FIG. 5A, the inverting input terminal of the comparator 231 is connected to a voltage source and receives the reference signal $S_3$ outputted by the voltage source, the non-inverting input terminal of the comparator 231 receives the detection signal $S_1$, and the output terminal of the comparator 231 outputs the periodic signal $S_2$. As shown in FIG. 5B, the output terminal of the comparator 231 is further connected to a Schmitt trigger ST. As shown in FIG. 5C, the inverting input terminal of the comparator 231 receives the sawtooth-wave reference signal $S_3$, and the Schmitt trigger ST is further connected to a delay line DL.

Figure 5D:
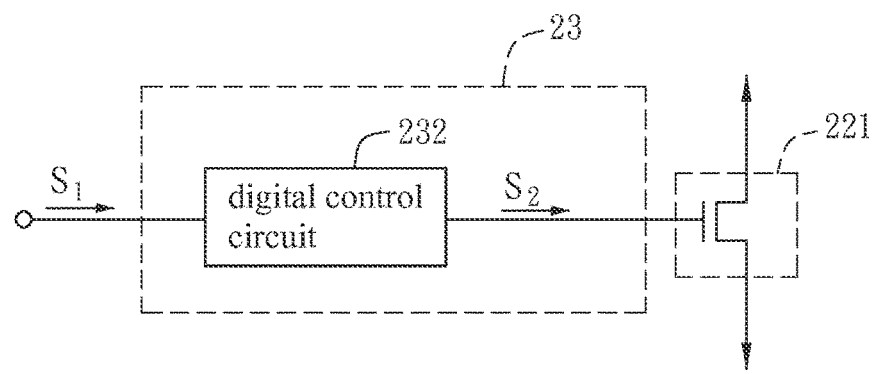
Figure 5E:
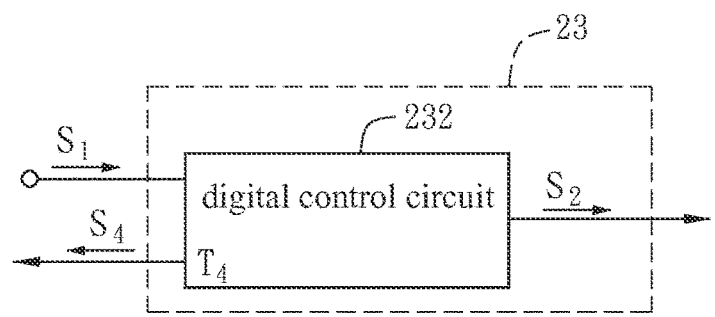

As shown in FIG. 5D, the comparing module 23 includes a digital control circuit 232, which is electrically connected to the first switching element 221, converts the detection signal $S_1$ into a digital signal, and compares the digital signal and a predetermined value to output the periodic signal $S_2$ to control the first switching element 221 and the second switching element (not shown) according to the comparing result. As shown in FIG. 5E, the digital control circuit 232 includes a data communication signal output end $T_4$ and outputs a data communication signal $S_4$ to the power system (not shown). When the controlled apparatus (not shown) is a battery cell, such as a secondary battery or an electric double-layer capacitor, the data communication signal $S_4$ includes information of charging state, discharging state, charging time, data for determining if charging or discharging is finished, usable voltage value, or their any combination. The power system $P_1$ makes decisions related to the power management according to the data communication signal $S_4$.

Figure 5F:
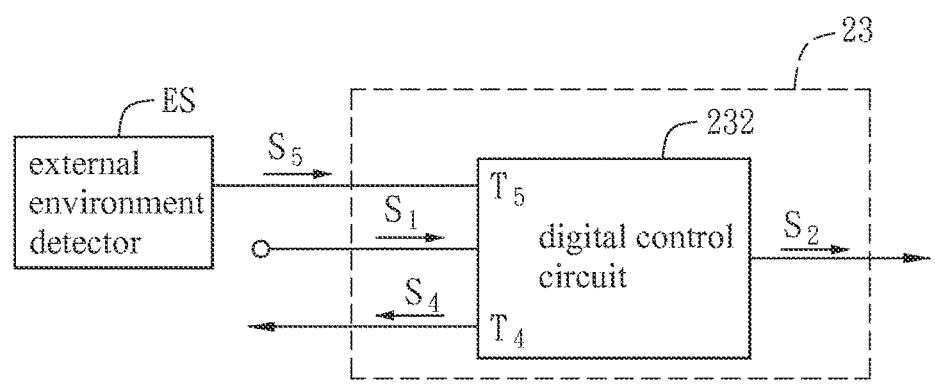

As shown in FIG. 5F, the digital control circuit 232 includes a data communication signal output end $T_4$ and an environment-state signal input end $T_5$. The environment-state signal input end $T_5$ is connected to an external environment detector ES and receives an environment-state signal $S_5$ including environment temperature or humidity information related to the controlled apparatus (not shown). The external environment detector ES can be a thermistor. Moreover, the data communication signal output end $T_4$ outputs a data communication signal $S_4$ including an operation information of the power management apparatus. The operation information includes voltage value, current value, voltage variation or current variation detected by the detection signal $S_1$, or frequency, duration of the turn-on period, duration of the cut-off period of the periodic signal $S_2$, or environment parameters detected by the environment-state signal $S_5$, or the data information derived from the above parameters.

As shown in FIG. 3, when the comparator 231 of the comparing module 23 compares the detection signal $S_1$ and the reference signal $S_3$ and the power supplied by the power system $P_1$ is determined to have exceeded the power that the controlled apparatus D requires, the comparator 231 outputs the periodic signal $S_2$ and the turn-on period of a cycle of the periodic signal $S_2$ turns on the first switching element 221, so that the current flows through the first energy storing element 211 and the first switching element 221 and the first energy storing element 211 thus stores the electric energy. Then, during the cut-off period of the said cycle, the first switching element 221 will be cut off and the energy stored by the first energy storing element 211 during the turn-on period will be released through the first rectifying element 212 and then stored by the second energy storing element 213. Subsequently, the energy will be released by the second energy storing element 213 through the second switching element 222 during the turn-on period of other cycle after the said cycle and then stored by the external energy storing element E.

Accordingly, due to the above-mentioned hardware construction, the extra energy can be stored by the external energy storing element E through an energy storing path that is formed by the first energy storing element 211 and the first switching element 221 and an energy releasing path that is formed by the second energy element 213 and the second switching element 222, wherein it is advantageous to the reuse of the energy. Moreover, in this embodiment, the current flowing into the first connection end $T_1$ totally flows out of the second connection end $T_2$. In other words, the electrical current flowing into the first connection end $T_1$ is equal to that flowing out of the second connection end $T_2$, so the current supplied by the power system won't be diverged or cut off during the operation of the power management apparatus 2.

Besides, the power management apparatus 2 can further include a current detecting element 24 that is electrically connected with the controlled apparatus D and outputs the detection signal $S_1$. As an embodiment, the current detecting element 24 can be disposed in various manners according to different product requirements or design considerations. FIGS. 6A to 6I are schematic diagrams showing some variations of the disposition of the current detecting element 24 according to an embodiment of the invention.

Figure 6A:
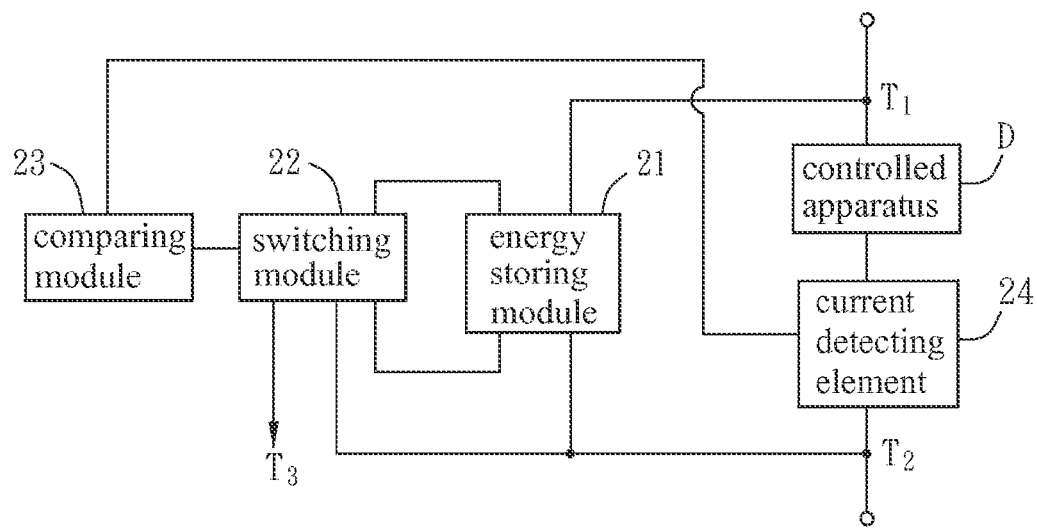
FIGS. 6A to 6I are schematic diagrams showing some variations of the disposition of the current detecting element according to an embodiment of the invention.
Figure 6B:
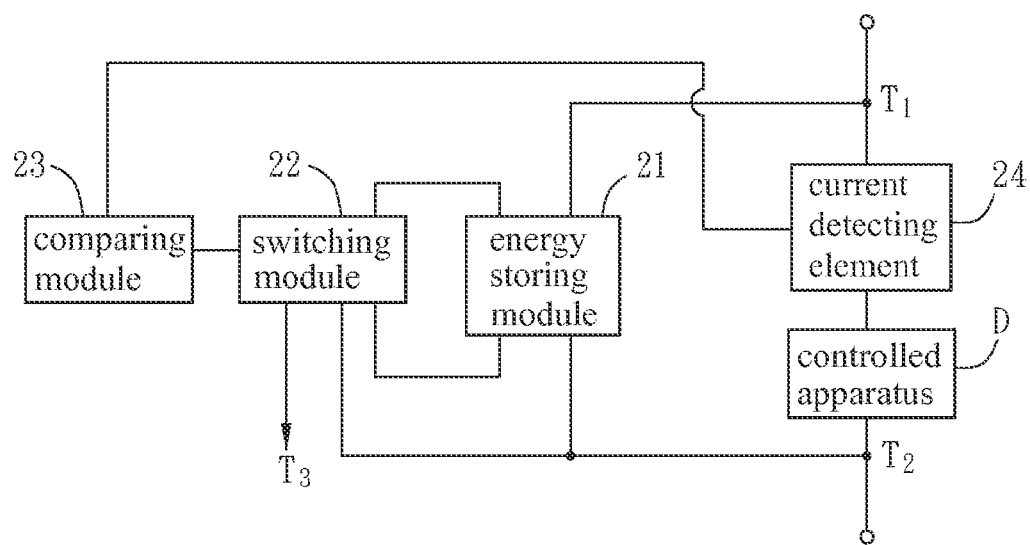
Figure 6C:
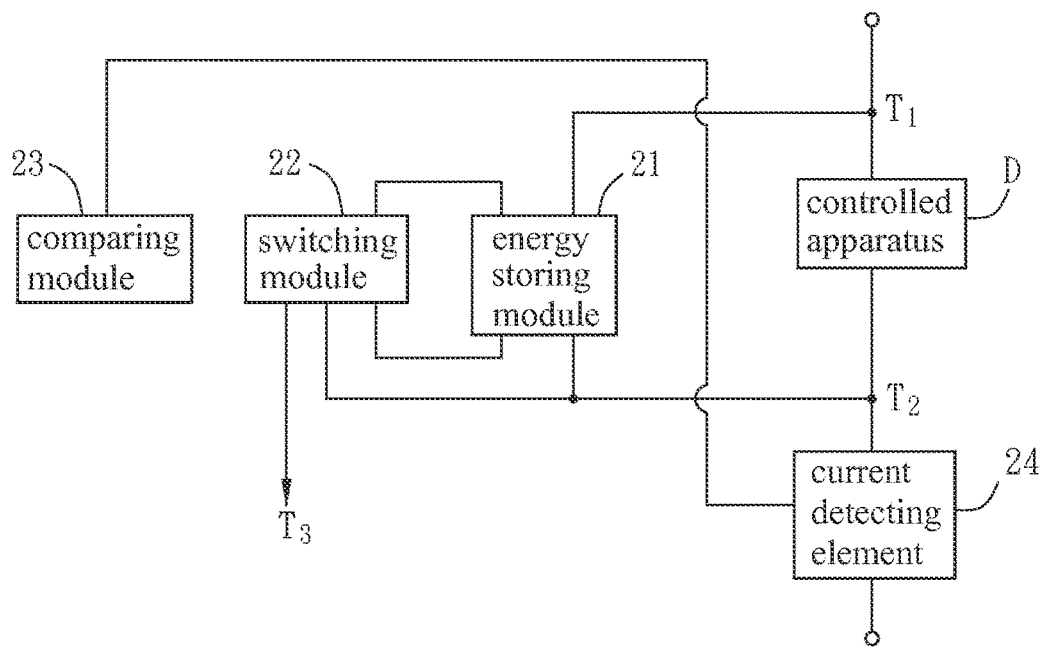
Figure 6D:
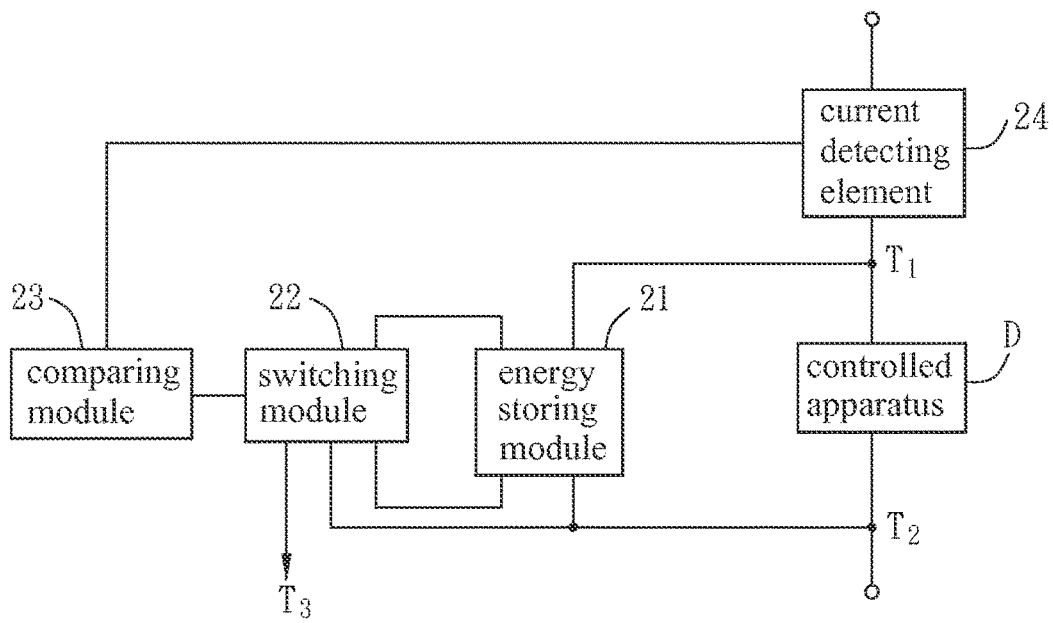
Figure 6E:
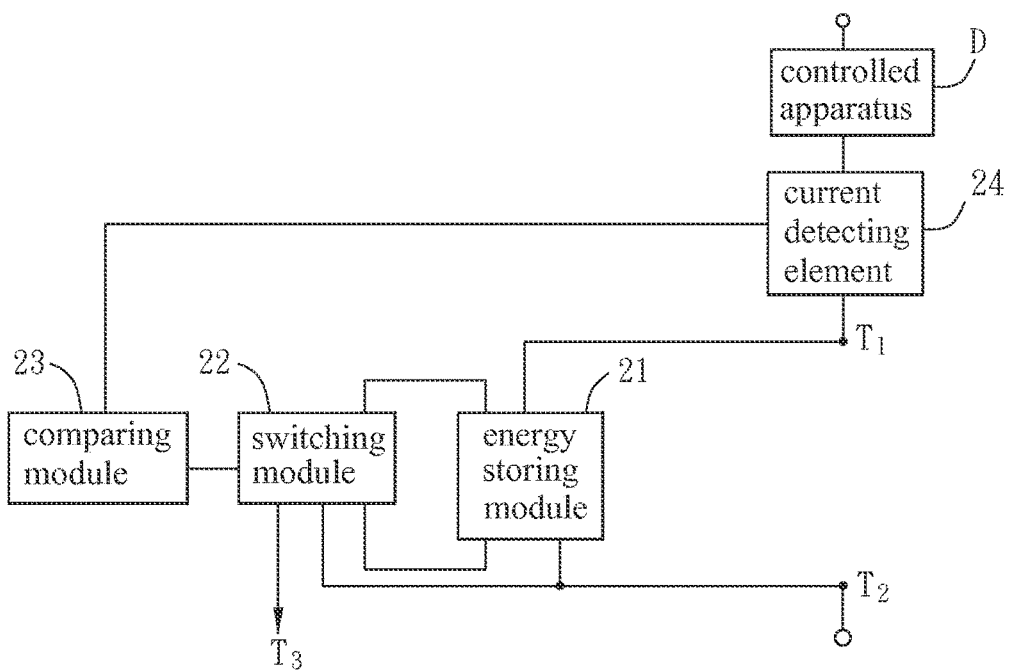
Figure 6F:
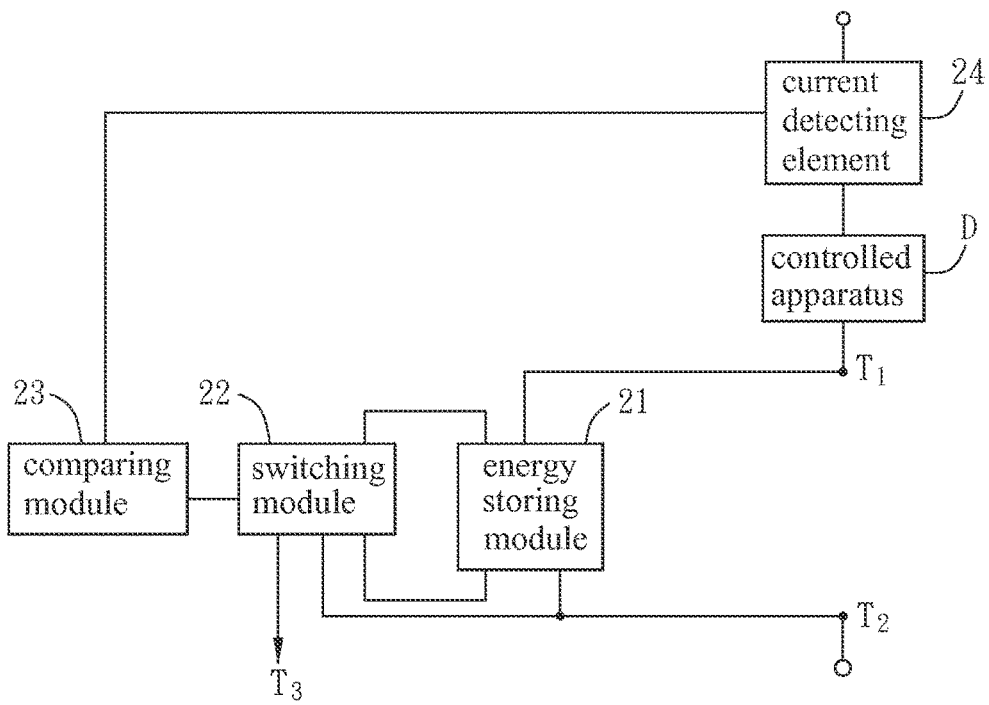
Figure 6G:
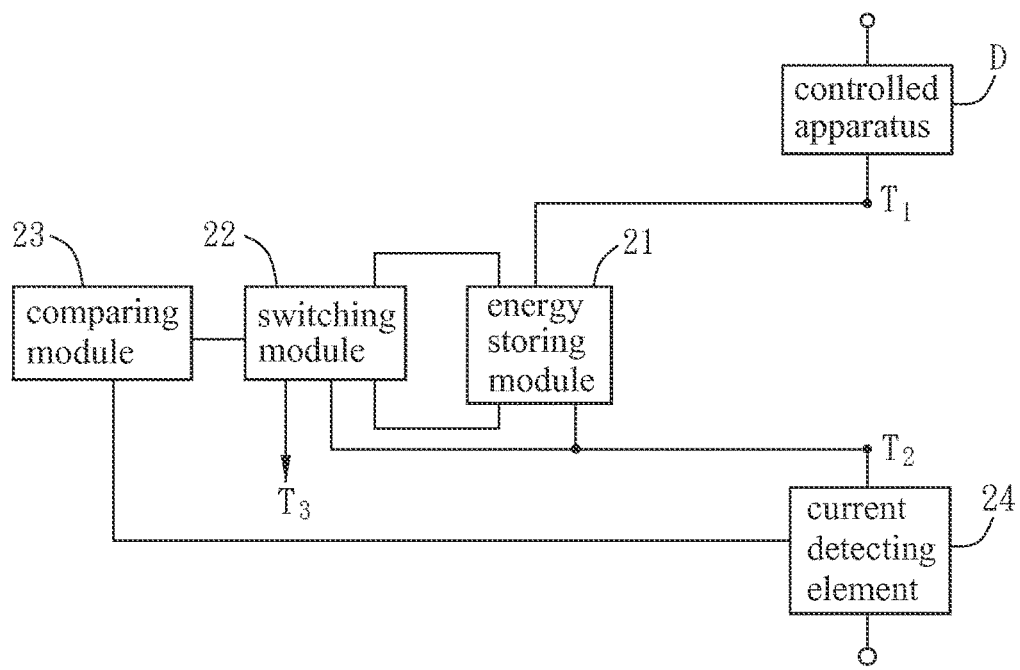
Figure 6H:
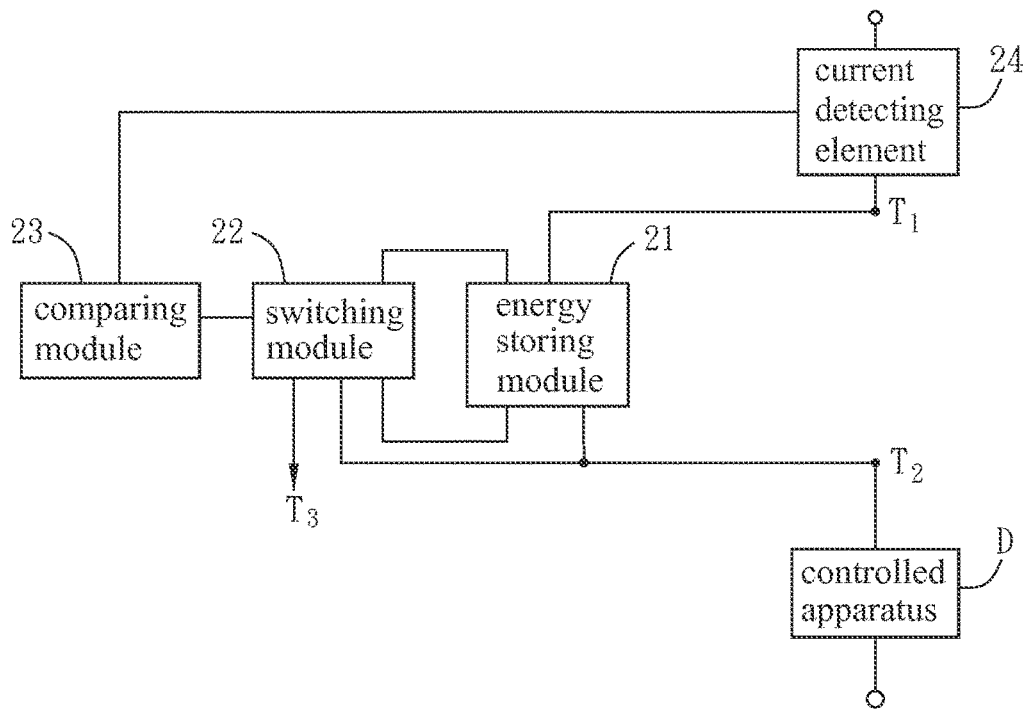
Figure 6I:
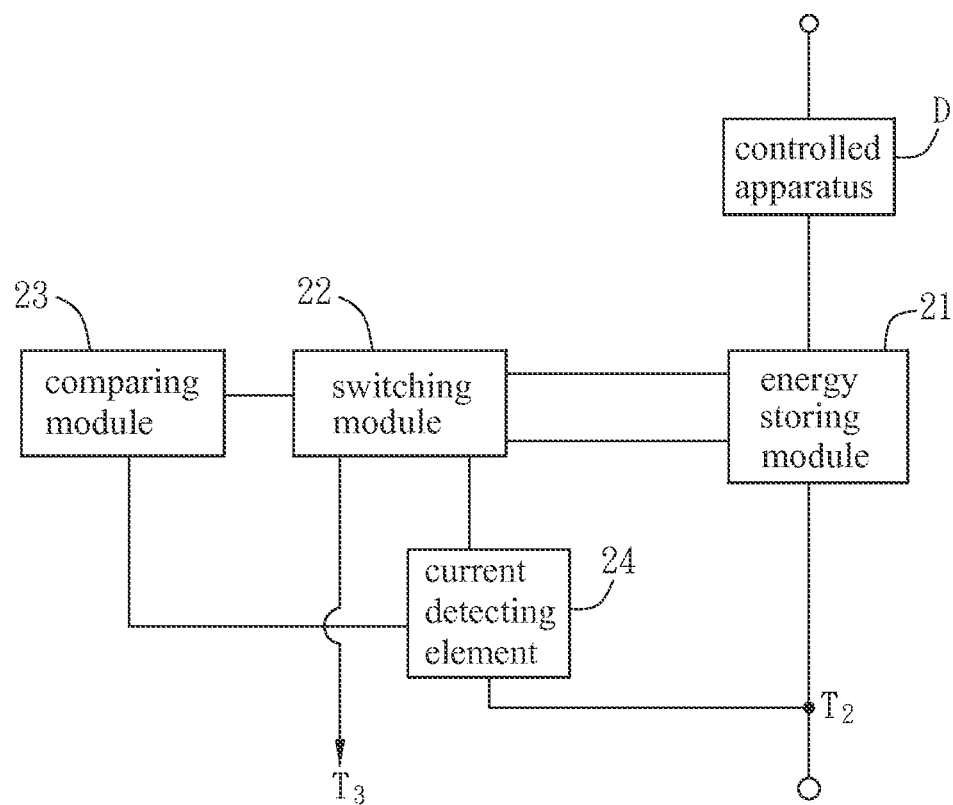

As shown in FIG. 6A, the current detecting element 24 is disposed between the controlled apparatus D and the second connection end $T_2$. As shown in FIG. 6B, the current detecting element 24 is disposed between the first connection end $T_1$ and the controlled apparatus D. As shown in FIG. 6C, the current detecting element 24 is electrically connected to the second connection end $T_2$, and forms a serial connection with the controlled apparatus D. As shown in FIG. 6D, the current detecting element 24 is electrically connected to the first connection end $T_1$, and forms a serial connection with the controlled apparatus D. As shown in FIG. 6E, the current detecting element 24 is disposed between the controlled apparatus D and the first connection end $T_1$. As shown in FIG. 6F, the current detecting element 24 is electrically connected to the controlled apparatus D, and forms a serial connection with the first connection end $T_1$. As shown in FIG. 6G, the current detecting element 24 is electrically connected to the second connection end $T_2$. As shown in FIG. 6H, the current detecting element 24 is electrically connected to the first connection end $T_1$. As shown in FIG. 6I, the current detecting element 24 is electrically connected to the second connection end $T_2$ and the switching module 22.

In practical applications, the current detecting element 24 also can have various circuit architectures. FIGS. 7A to 7E are schematic diagrams of five illustrative architectures of the current detecting element 24 according to an embodiment of the invention.

Figure 7A:
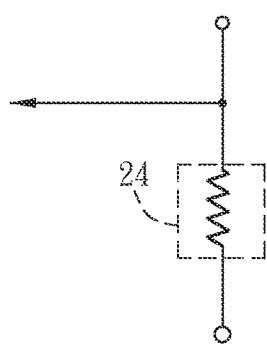
FIGS. 7A to 7E are schematic diagrams of five illustrative architectures of the current detecting element according to an embodiment of the invention.
Figure 7B:
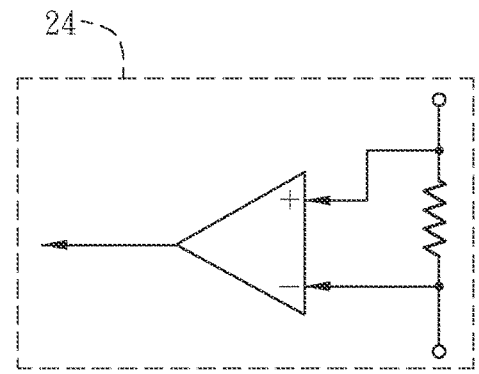
Figure 7C:
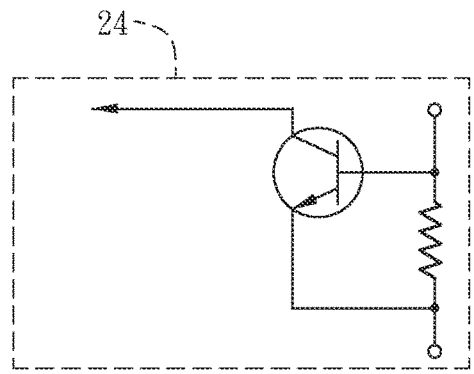
Figure 7D:
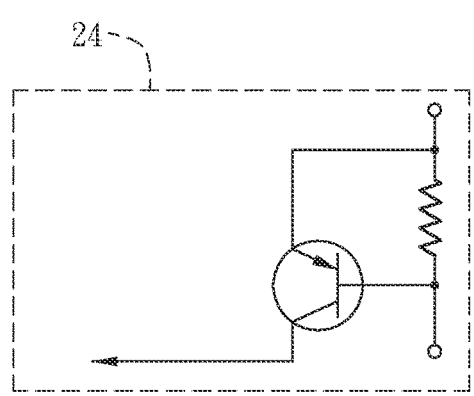
Figure 7E:
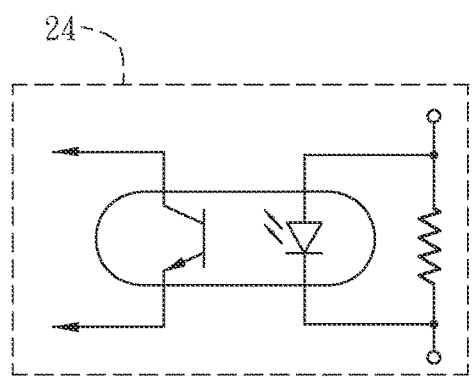

As shown in FIG. 7A, the current detecting element 24 is a resistance. As shown in FIG. 7B, the current detecting element 24 includes a resistor and an amplifier. As shown in FIG. 7C, the current detecting element 24 includes a resistor and an NPN transistor. As shown in FIG. 7D, the current detecting element 24 includes a resistor and a PNP transistor. As shown in FIG. 7E, the current detecting element 24 includes a resistor and an optical coupler of an isolation type.

Figure 8A:
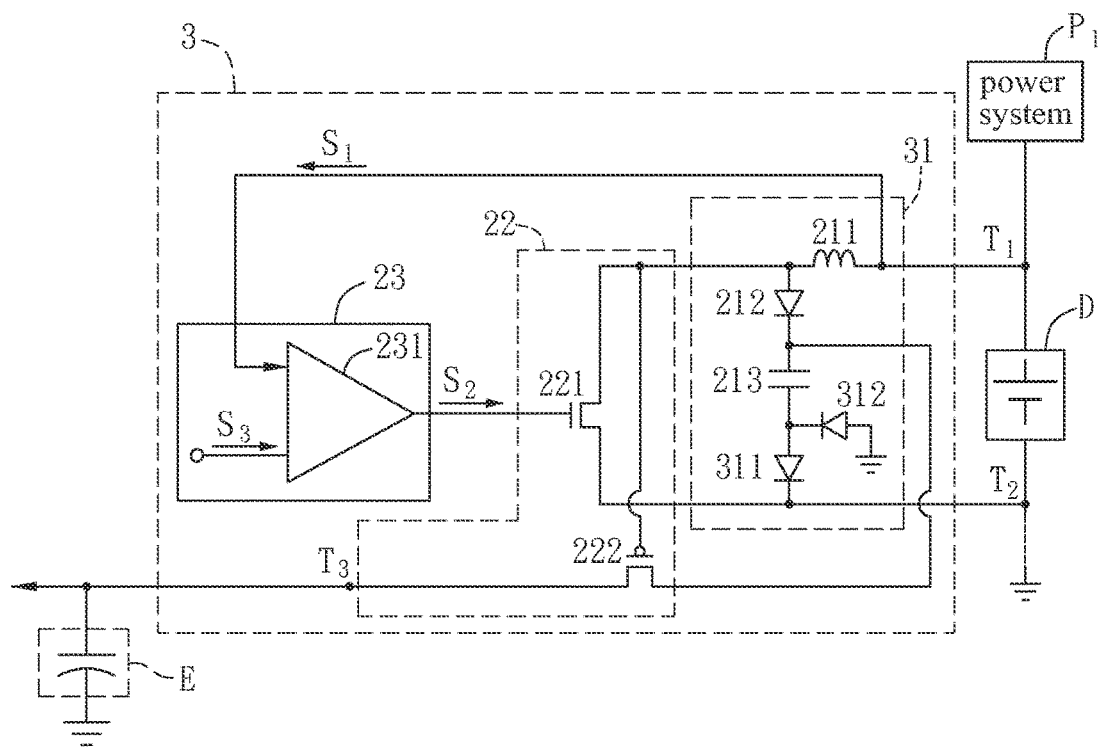
FIGS. 8A and 8B are schematic diagrams of the power management apparatus and related operative waveforms according to another embodiment of the invention.

FIG. 8A is a schematic diagram of a power management apparatus 3 according to another embodiment of the invention. In comparison with the power management apparatus 2 of FIG. 3, the energy storing module 31 of the power management apparatus 3 further includes a second rectifying element 311 and a third rectifying element 312. In this embodiment, the controlled apparatus D is a single secondary battery for example. In other embodiments, however, the controlled apparatus D can include more secondary batteries according to the requirements, and the secondary batteries can be connected together in serial or parallel.

One end of the second rectifying element 311 is electrically connected to the second energy storing element 213 and the other end of the second rectifying element 311 is electrically connected to the second connection end $T_2$. One end of the third rectifying element 312 is electrically connected to the second energy storing element 213 and the other end of the third rectifying element 312 is electrically connected the external energy storing element E, and in this example it is connected to the grounding end of the external energy storing element E.

Figure 8B:
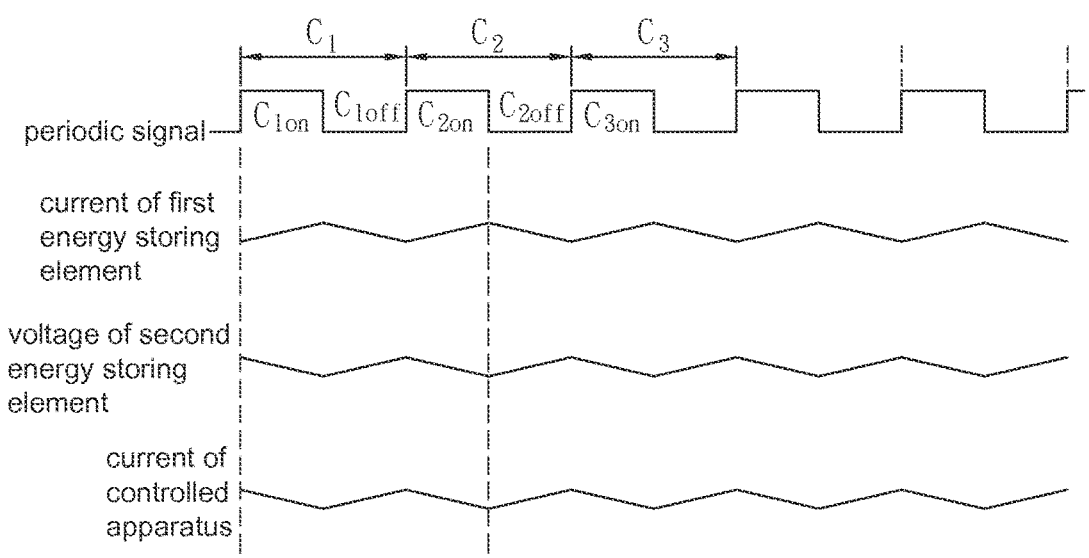

The power management apparatus 3 will be further illustrated by referring to FIG. 8B with FIG. 8A. When the power supplied by the power system $P_1$ exceeds the power that the controlled apparatus D requires, the comparator 231 outputs the periodic signal $S_2$. The first switching element 221 will be turned on during the turn-on period $C_{1on}$ of the first cycle $C_1$ of the periodic signal $S_2$. Meanwhile, the current will flow to the first energy storing element 211 and the first switching element 221 from the first connection end $T_1$ and flow out of the second connection end $T_2$, so the first energy storing element 211 stores the energy from the said current during the turn-on period $C_{1on}$.

The first switching element 221 will be cut off during the cut-off period $C_{1off}$ of the first cycle $C_1$ of the periodic signal $S_2$. Meanwhile, the current will flow through the first energy storing element 211, the first rectifying element 212, the second energy storing element 213 and the second rectifying element 311, and flow out of the second connection end $T_2$. In other words, the first energy storing element 211 and the first rectifying element 212 form an energy releasing path, and the second energy storing element 213 and the second rectifying element 311 form an energy storing path. That is to say, the first energy storing element 211 releases the energy during the cut-off period $C_{1off}$ and the second energy storing element 213 stores the energy during the cut-off period $C_{1off}$.

Then, like the turn-on period $C_{1on}$ of the first cycle $C_1$, the first energy storing element 211 also stores the energy during the turn-on period $C_{2on}$ of the second cycle $C_2$ of the periodic signal $S_2$. Meanwhile, the previously stored energy is released to the external energy storing element E through the energy releasing end $T_3$ by the energy releasing path that is formed by the third rectifying element 312, the second energy storing element 213 and the second switching element 222.

During the cut-off period $C_{2off}$ of the second cycle $C_2$ of the periodic signal $S_2$, the first energy storing element 211 and the second energy storing element 213 have the same operation as during the cut-off period $C_{1off}$ of the first cycle $C_1$. In other words, the first energy storing element 211 will release energy and the second energy storing element 213 will store energy.

Then, during the turn-on period $C_{3on}$ of the third cycle $C_3$ of the periodic signal $S_2$, each of the first energy storing element 211 and the second energy storing element 213 will have the same operation as during the turn-on period $C_{2on}$ of the second cycle $C_2$. Accordingly, when the power supplied by the power system $P_1$ exceeds the power that the controlled apparatus D requires, the power management apparatus 3 basically takes 1.5 cycles of the periodic signal $S_2$ as an operative cycle to effectively deliver the extra electric energy to the external energy storing element E for achieving the purpose of energy reuse.

Figure 8C:
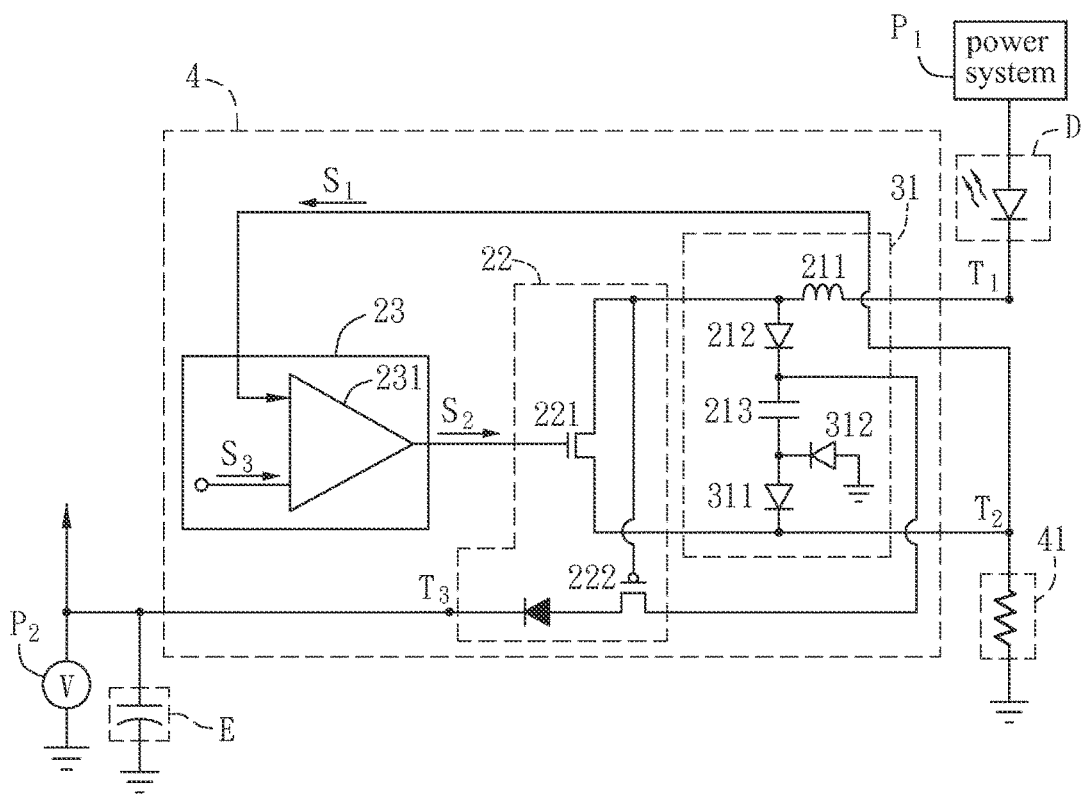
FIGS. 8C and 8D are schematic diagrams of the power management apparatus and related operative waveforms according to another embodiment of the invention.
Figure 8D:
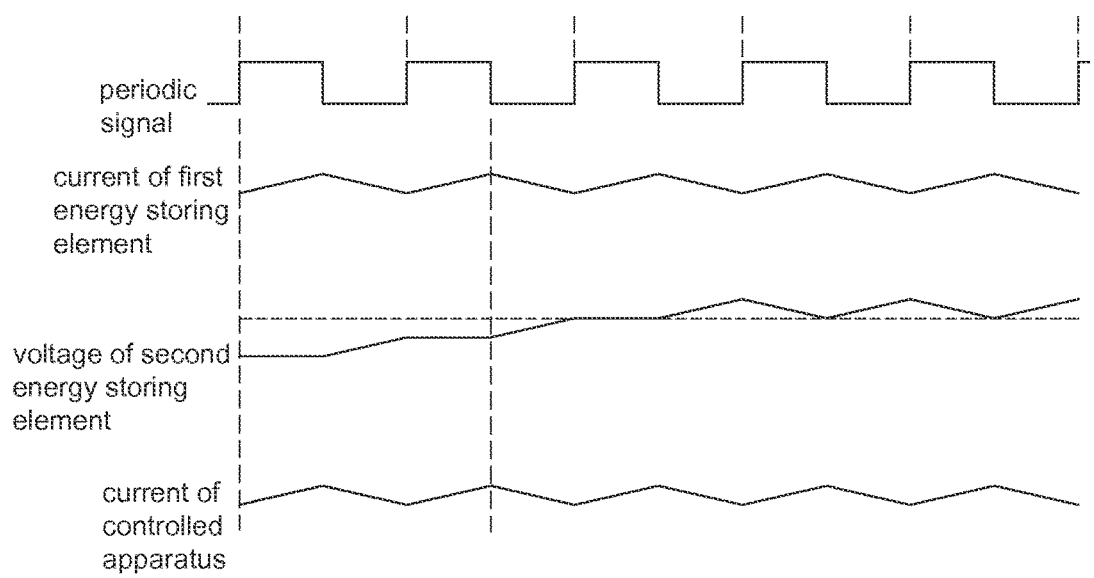

FIGS. 8C and 8D are schematic diagrams showing a power management apparatus 4 and the related operative waveforms according to another embodiment of the invention. In comparison with the power management apparatus 3, the power management apparatus 4 is connected to the controlled apparatus D in serial and includes a current detecting element. In this embodiment, the energy releasing end $T_3$ of the switching module 22 is connected to an external power $P_2$ and an external energy storing element E. Accordingly, the main difference in the operation between the power management apparatuses 3 and 4 is that the energy can only be released when the electric energy (voltage) stored by the second energy storing element 213 of the power management apparatus 4 is greater than the voltage value of the external power $P_2$. The controlled apparatus D is a single LED for example in this embodiment. In other embodiments, however, the controlled apparatus D can include more LEDs according to the requirements, and the LEDs can be connected together in serial or parallel.

Figure 9A:
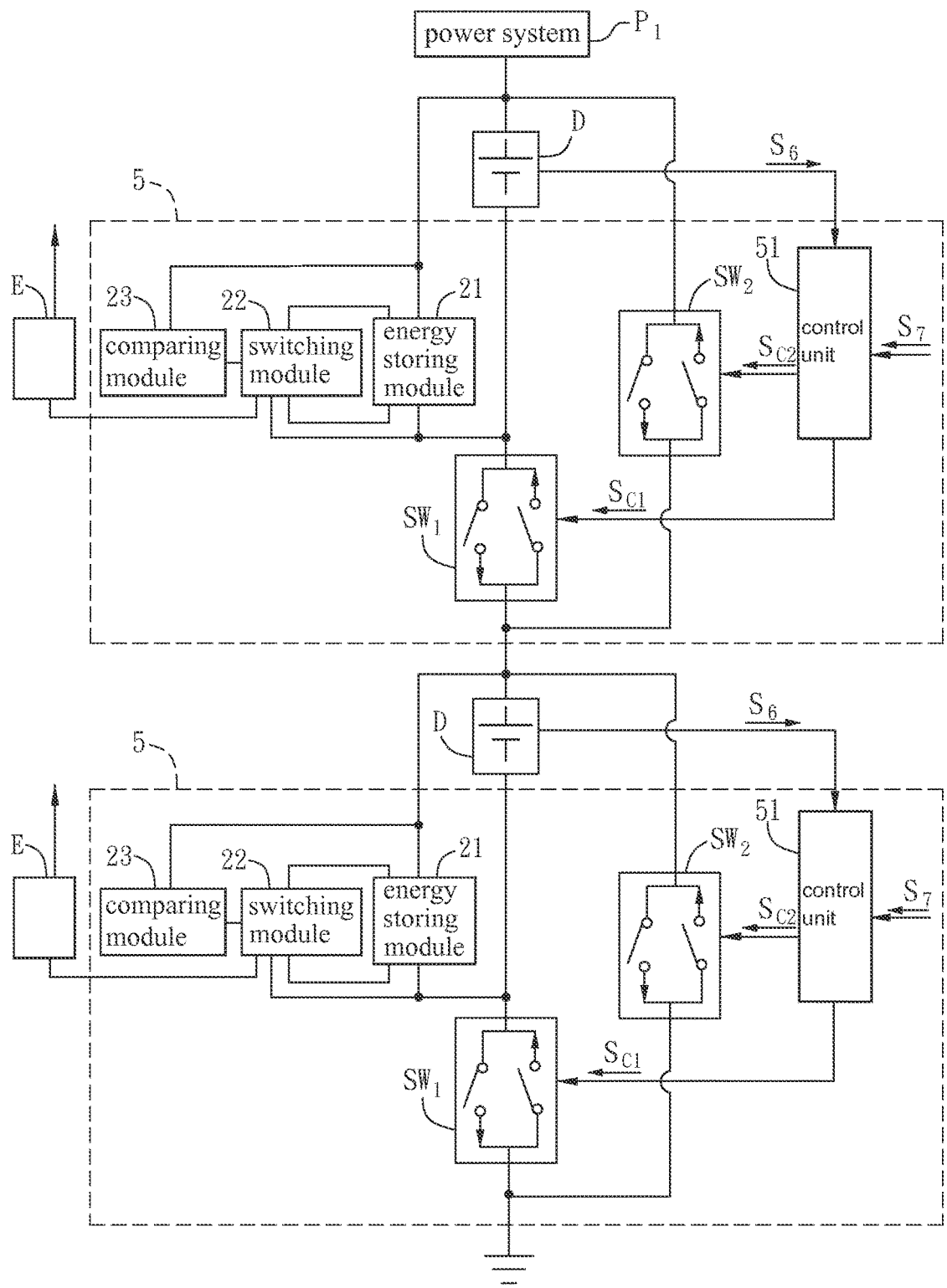
FIGS. 9A to 9I are schematic diagrams of some variations of the power management apparatus according to an embodiment of the invention.

FIG. 9A is a schematic diagram of a power management apparatus 5 according to another embodiment of the invention. As shown in FIG. 9A, two power management apparatuses 5 are disposed corresponding to two controlled apparatuses D in this embodiment, and the two controlled apparatuses D are connected in serial and they are secondary batteries for example. In comparison with the power management apparatus 2, the power management apparatus 5 further includes a first switching unit $SW_1$, a second switching unit $SW_2$ and a control unit 51.

The first switching unit $SW_1$ is connected to the controlled apparatus D in series to form a series circuit. The second switching unit $SW_2$ is electrically connected to the series circuit and provides a charging path or a discharging path when the first switching unit $SW_1$ is cut off. The control unit 51 is electrically connected to the controlled apparatus D, the first switching unit $SW_1$ and the second switching unit $SW_2$, and outputs a first control signal $S_{C1}$ to the first switching unit $SW_1$ or outputs a second control signal $S_{C2}$ to the second switching unit $SW_2$ according to a controlled-apparatus-state signal $S_6$ or a control communication signal $S_7$.

The controlled-apparatus-state signal $S_6$ is a current value or a voltage value representing the state of the controlled apparatus D and particularly representing the discharging state or charging state of the controlled apparatus D. Accordingly, the control unit 51 determines the controlled apparatus D is chargeable or dischargeable according to the controlled-apparatus-state signal $S_6$ to control the turn-on or cut-off of the first and second switching units $SW_1$ and $SW_2$ so as to provide several current paths. The control communication signal $S_7$ includes an operation information of the power management apparatus 5, and the operation information includes a voltage value, current value, voltage variation or current variation detected by the controlled-apparatus-state signal $S_6$, or environment parameters detected by the environment-state signal $S_5$, or the data information derived from the above parameters, or the state information of the first or second control signal $S_{C1}$ or $S_{C2}$, or the remotely inputted information for controlling the first control signal $S_{C1}$ or the second control signal $S_{C2}$. Moreover, the control communication signal $S_7$ can be a digital signal or an analog signal.

For the convenience of illustration, the power management apparatus 5 and the controlled apparatus D directly electrically connected to the power system $P_1$ are called the first stage power management apparatus and the first stage controlled apparatus, respectively, and another power management apparatus 5 and controlled apparatus D are called the second stage power management apparatus and the second stage controlled apparatus, respectively.

When the control units 51 of the first and second stage power management apparatuses 5 determine that the first and second stage controlled apparatuses D are chargeable according to the controlled-apparatus-state signals $S_6$ of the first and second stage controlled apparatuses D, the two control units 51 transmit the first control signal $S_{C1}$ to turn on the first switching unit $SW_1$ and transmit the second control signal $S_{C2}$ to cut off the second switching unit $SW_2$ so that the power system $P_1$ can charge the two controlled apparatuses D at the same time.

When the first stage controlled apparatus D has been totally charged and can't be charged anymore, the control unit 51 of the first stage power management apparatus 5 transmits the first control signal $S_{C1}$ to cut off the first switching unit $SW_1$ of the first stage power management apparatus 5 and transmits the second control signal $S_{C2}$ to turn on the second switching unit $SW_2$ of the first stage power management apparatus 5 according to the controlled-apparatus-state signal $S_6$ of the first stage controlled apparatus D, so that the power system $P_1$ only charges the second stage controlled apparatus D and the first stage controlled apparatus D is excluded from the charging loop so as not to be charged.

Because the control unit 51 can control the first and second switching units $SW_1$ and $SW_2$ according to the controlled-apparatus-state signal $S_6$, when the charging voltage provided by the power system $P_1$ is too low, the two controlled apparatuses D can be charged alternately. For example, the first stage controlled apparatus D is firstly charged and then the second stage controlled apparatus D is charged, or the second stage controlled apparatus D is firstly charged and then the first stage controlled apparatus D is charged, or they can be charged alternately at a fixed interval.

Likewise, when any stage's controlled apparatus D doesn't require discharge, the control unit 51 can force the controlled apparatus D to be excluded from the discharging loop through the switching of the first and second switching units $SW_1$ and $SW_2$.

Therefore, through the above-mentioned hardware construction, the power management apparatus 5 is not only capable of storing extra energy and reusing the energy but also is capable of alternately controlling the charging or discharging so as to provide charge and discharge protections. Besides, the power management apparatus 5 also can make the controlled apparatus totally excluded from the charging or discharging loop and will not affect the function of other controlled apparatuses.

To be noted, although two stages of the power management apparatuses 5 and controlled apparatuses D are used for the illustration, more stages of the power management apparatuses 5 and controlled apparatuses D can be used according to the practical requirements.

The power management apparatus 5 and the control unit 51 can have various embodiments in the application. For example, the control unit 51 is a comparator and outputs the first control signal $S_{C1}$ or the second control signal $S_{C2}$ according to the comparing result of the controlled-apparatus-state signal $S_6$ and a predetermined value, or the control unit 51 is a digital control circuit including a microcontroller and converts the controlled-apparatus-state signal $S_6$ into a digital signal to output the first control signal $S_{C1}$ or the second control signal $S_{C2}$ according to the comparing result of the digital signal and a predetermined value, or the control unit 51 is a signal convertor and receives the control communication signal $S_7$, by using the optical coupler of FIG. 7E for example, to output the first control signal $S_{C1}$ or the second control signal $S_{C2}$, or the control unit 51 is similar to the digital control circuit 232 of FIGS. 5E and 5F including a communication signal output end and an environment-state signal input end. To be noted, although the control unit 51 and the comparing module 23 are separate elements in this embodiment, they can be integrated into a digital control circuit in other embodiments and the control units 51 of different stage of power management apparatuses 5 can be integrated into a system-on-a-chip (SOC) with the comparing module 23.

Figure 9B:
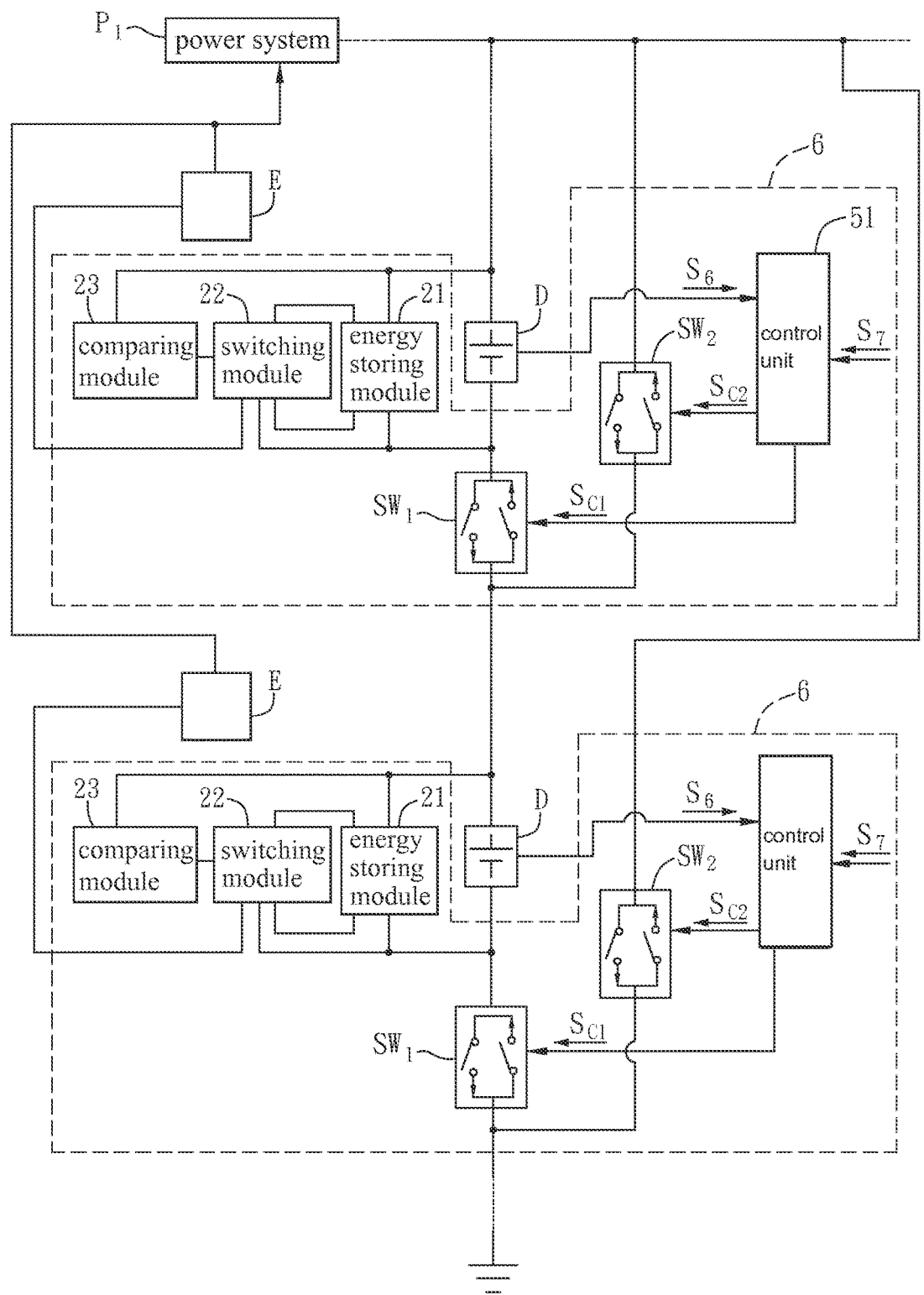
Figure 9C:
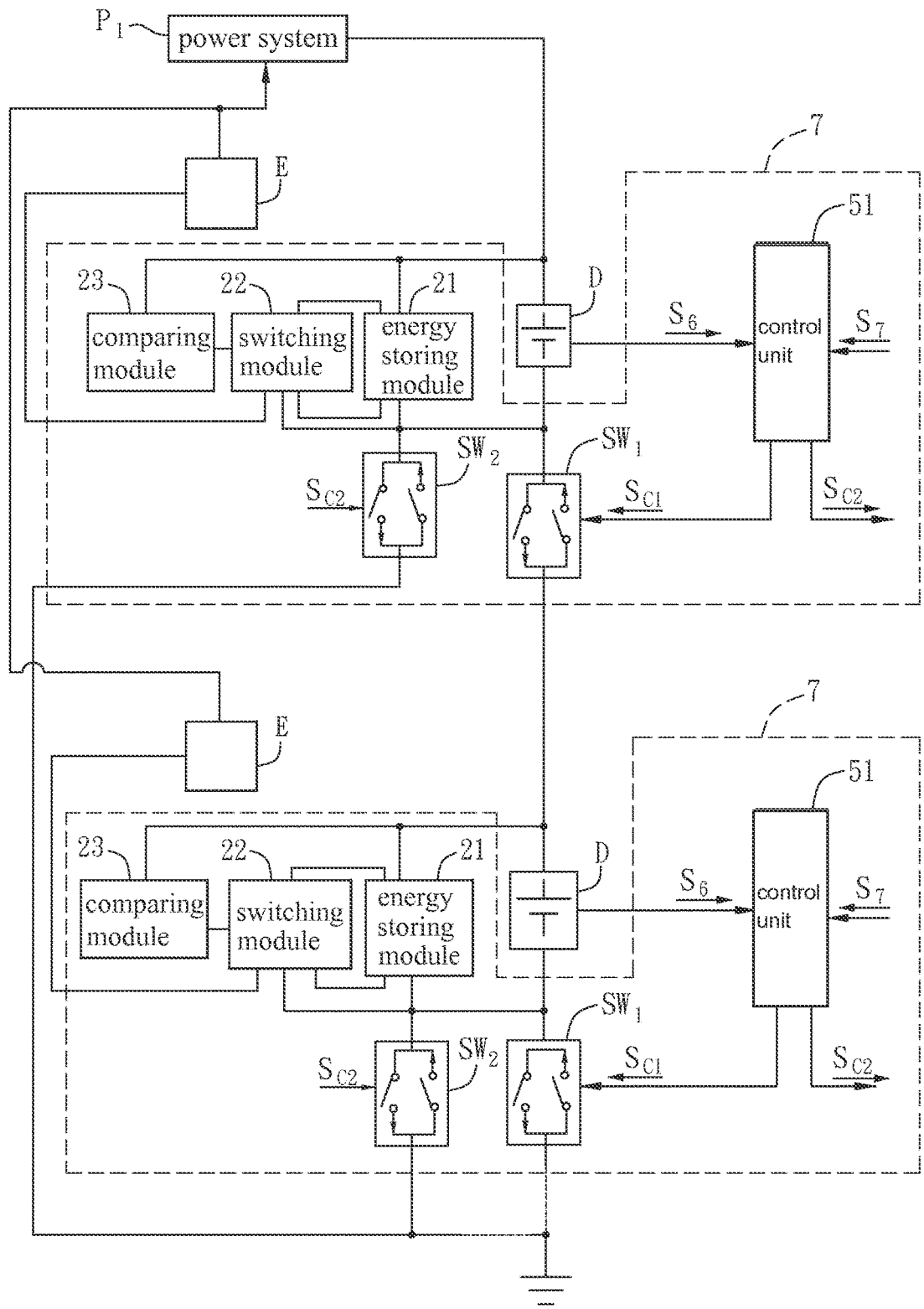
Figure 9D:
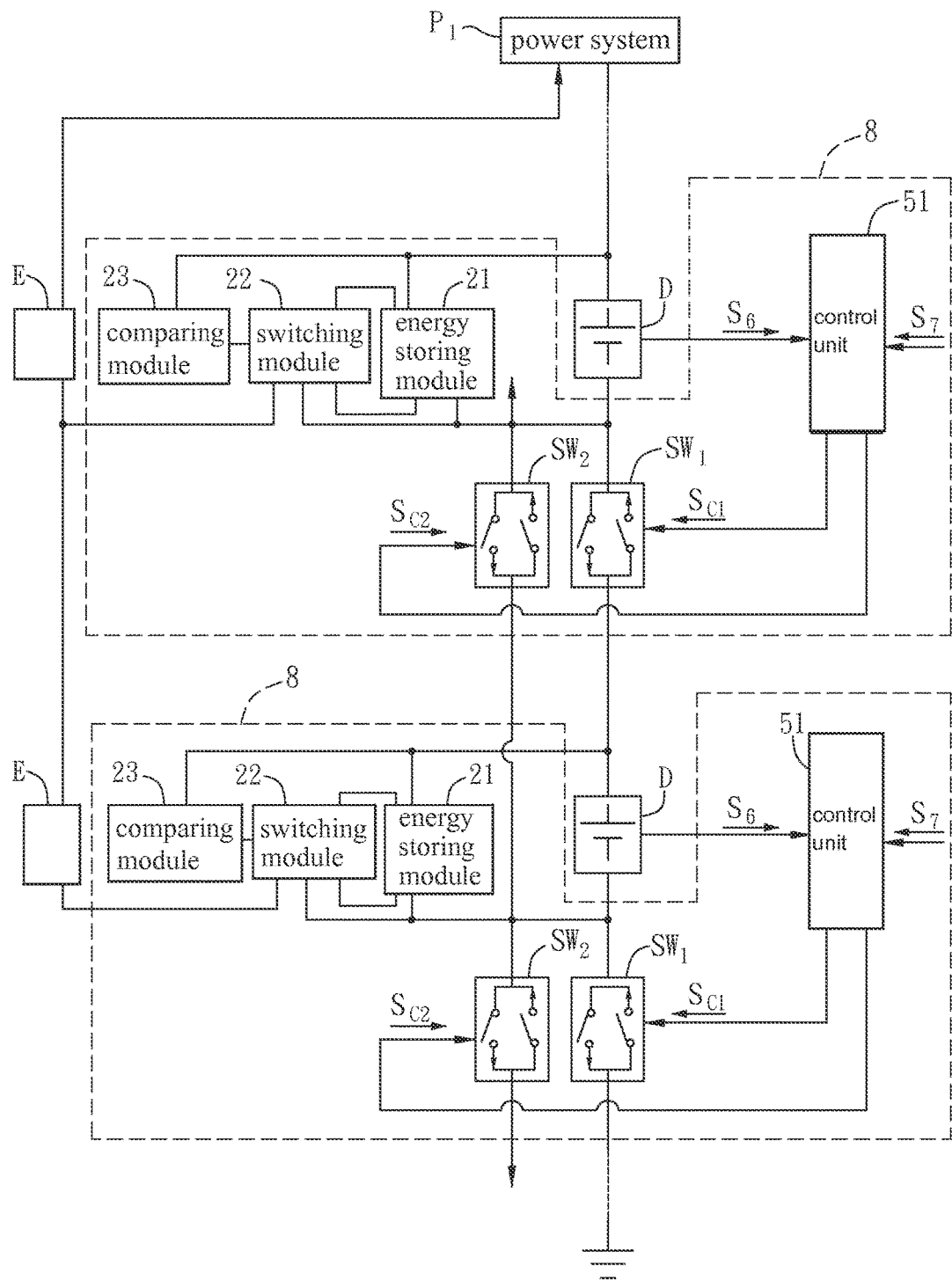

FIGS. 9B to 9I are schematic diagrams of some variations of the power management apparatus according to an embodiment of the invention. As shown in FIG. 9B, in comparison with the power management apparatus 5, one end of the second switching unit $SW_2$ of the power management apparatus 6 is electrically connected to the power system $P_1$ and the other end thereof is electrically connected to the first switching unit $SW_1$. As shown in FIG. 9C, the main difference between the power management apparatuses 7 and 5 is that one end of the second switching unit $SW_2$ of the power management apparatus 7 is electrically connected to the controlled apparatus D and the first switching unit $SW_1$ and the other end thereof is electrically connected to a grounding end of the power system $P_1$. As shown in FIG. 9D, the main difference between the power management apparatuses 8 and 5 is that one end of the second switching unit $SW_2$ of the power management apparatus 8 is electrically connected to the controlled apparatus D and the first switching unit $SW_1$, and the second switching unit $SW_2$ is parallelly connected to the combination of the first switching unit $SW_1$ and the controlled apparatus D of another stage's power management apparatus 8.

Figure 9E:
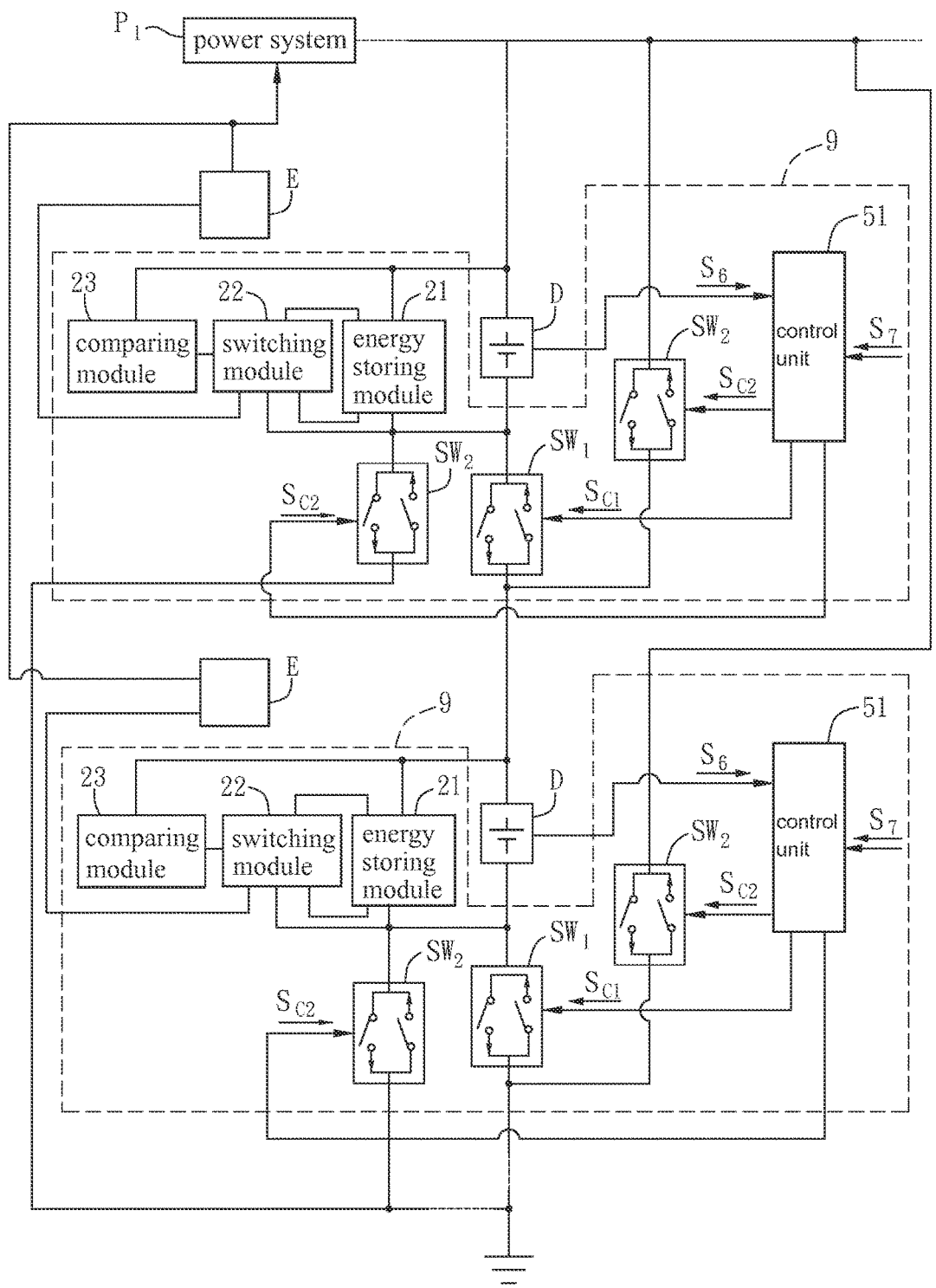

As shown in FIG. 9E, the power management apparatus 9 includes two second switching units $SW_2$. In this embodiment, one of the second switching units $SW_2$ of the power management apparatus 9 is disposed the same as the second switching unit $SW_2$ of the power management apparatus 6 in FIG. 9B, and the other second switching units $SW_2$ of the power management apparatus 9 is disposed the same as the second switching unit $SW_2$ of the power management apparatus 7 in FIG. 9C.

To be noted, by parallelly connecting the second switching unit $SW_2$ to the serial circuit formed by the controlled apparatus D and the first switching unit $SW_1$, or by parallelly connecting to the power system $P_1$ or the grounding end of the power system $P_1$, the various configurations of different circuit numbers in serial or parallel can be generated between the controlled apparatuses of different stages during the charge or discharge.

Figure 9F:
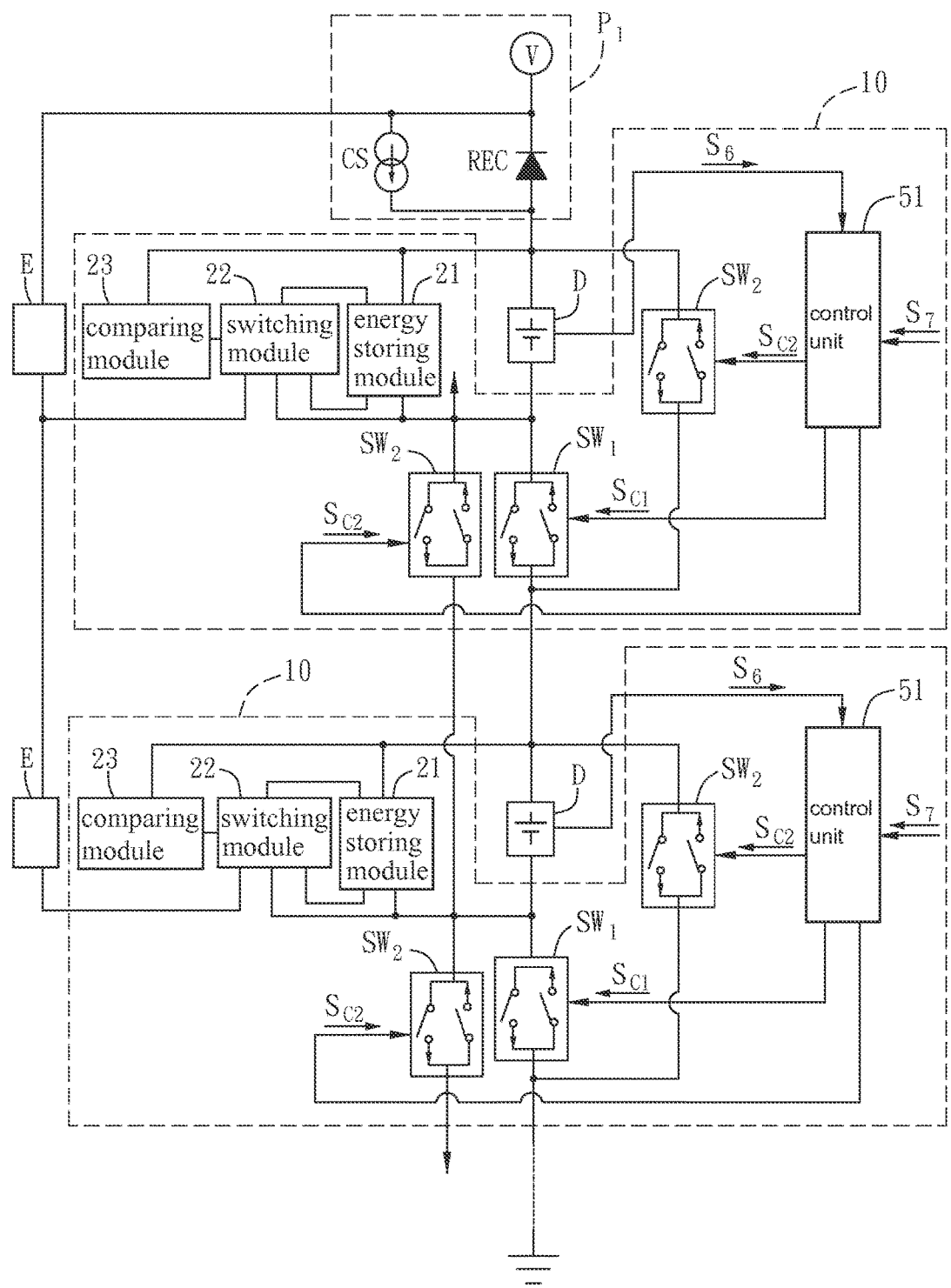

As shown in FIG. 9F, the power management apparatus 10 includes two second switching units $SW_2$. In this embodiment, one of the second switching units $SW_2$ of the power management apparatus 10 is disposed the same as the second switching unit $SW_2$ of the power management apparatus 6 in FIG. 9B, and the other second switching units $SW_2$ of the power management apparatus 10 is disposed the same as the second switching unit $SW_2$ of the power management apparatus 8 in FIG. 9D.

Moreover, the power system $P_1$ further includes a current source CS and a rectifying element REC. The current source CS is electrically connected to the controlled apparatus D and the energy storing module 21. The rectifying element REC is connected to the current source CS in parallel. The control unit 51 outputs the second control signal $S_{C2}$ to the second switching unit $SW_2$ according to the controlled-apparatus-state signal $S_6$ or the control communication signal $S_7$.

In this embodiment, the example is made by two power management apparatuses 10 cooperating with the controlled apparatus D of a corresponding number. As below, for the convenience of illustration, the power management apparatus 10 and the controlled apparatus D which are closer to the power system $P_1$ in FIG. 9F are called the first stage power management apparatus and the first stage controlled apparatus, respectively, and the other power management apparatus 10 and controlled apparatus D are called the second stage power management apparatus and the second stage controlled apparatus, respectively.

When the first switching units $SW_1$ of the first and second stage power management apparatuses 10 are turned on and all the second switching units $SW_2$ are cut off, the first stage controlled apparatus D and the second stage controlled apparatus D will become a serial connection. When the two second switching units $SW_2$ of the first stage power management apparatuses 10 and the first switching unit $SW_1$ of the second stage power management apparatus 10 are turned on and the other switching units are cut off, the first stage controlled apparatus D and the second stage controlled apparatus D will become a parallel connection. Accordingly, through the said disposition of the second switching unit $SW_2$, the first stage controlled apparatus D and the second stage controlled apparatus D can become a serial or parallel connection.

Figure 9G:
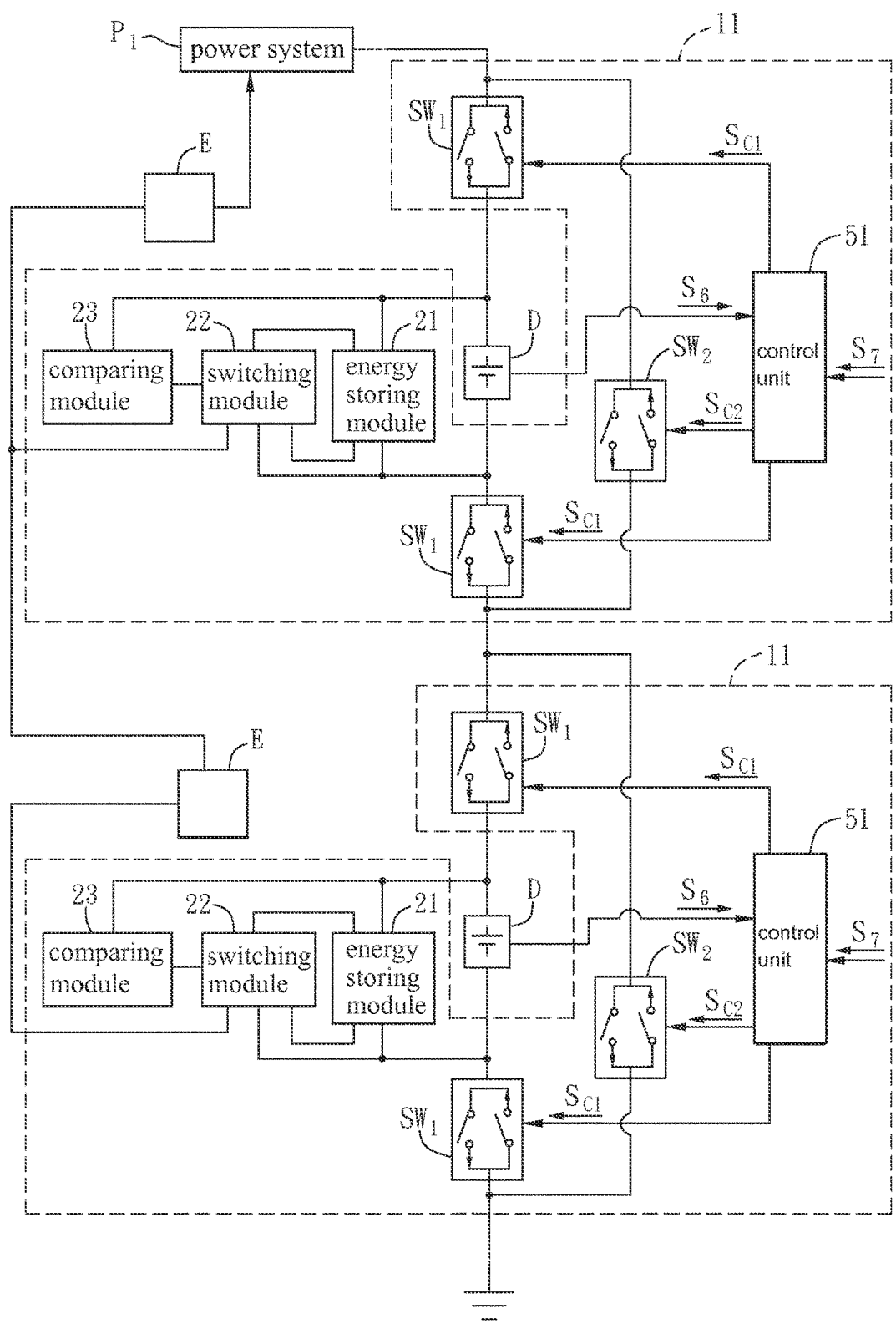

As shown in FIG. 9G, the power management apparatus 11 includes two first switching units $SW_1$ and is connected to the controlled apparatus D in serial. The control unit 51 outputs the first control signal $S_{C1}$ to the first switching unit $SW_1$ according to the controlled-apparatus-state signal $S_6$ or the control communication signal $S_7$.

Through the above-mentioned disposition of the first switching unit $SW_1$, when the above-mentioned first switching units $SW_1$ are all cut off, the controlled apparatus D can be excluded from the charging or discharging path formed by the other controlled apparatuses D and can be separately charged by another power source, such as the external energy storing element E connected to the energy releasing end $T_3$ of the switching module 22. Therefore, according to the hardware construction of the power management apparatus 11, one of the controlled apparatuses D can be excluded from the discharging path in order to be charged when the other controlled apparatuses D are discharging. Besides, the said controlled apparatus D can be separately charged by the extra energy that is stored earlier so that the purpose of energy reuse can be achieved.

Figure 9H:
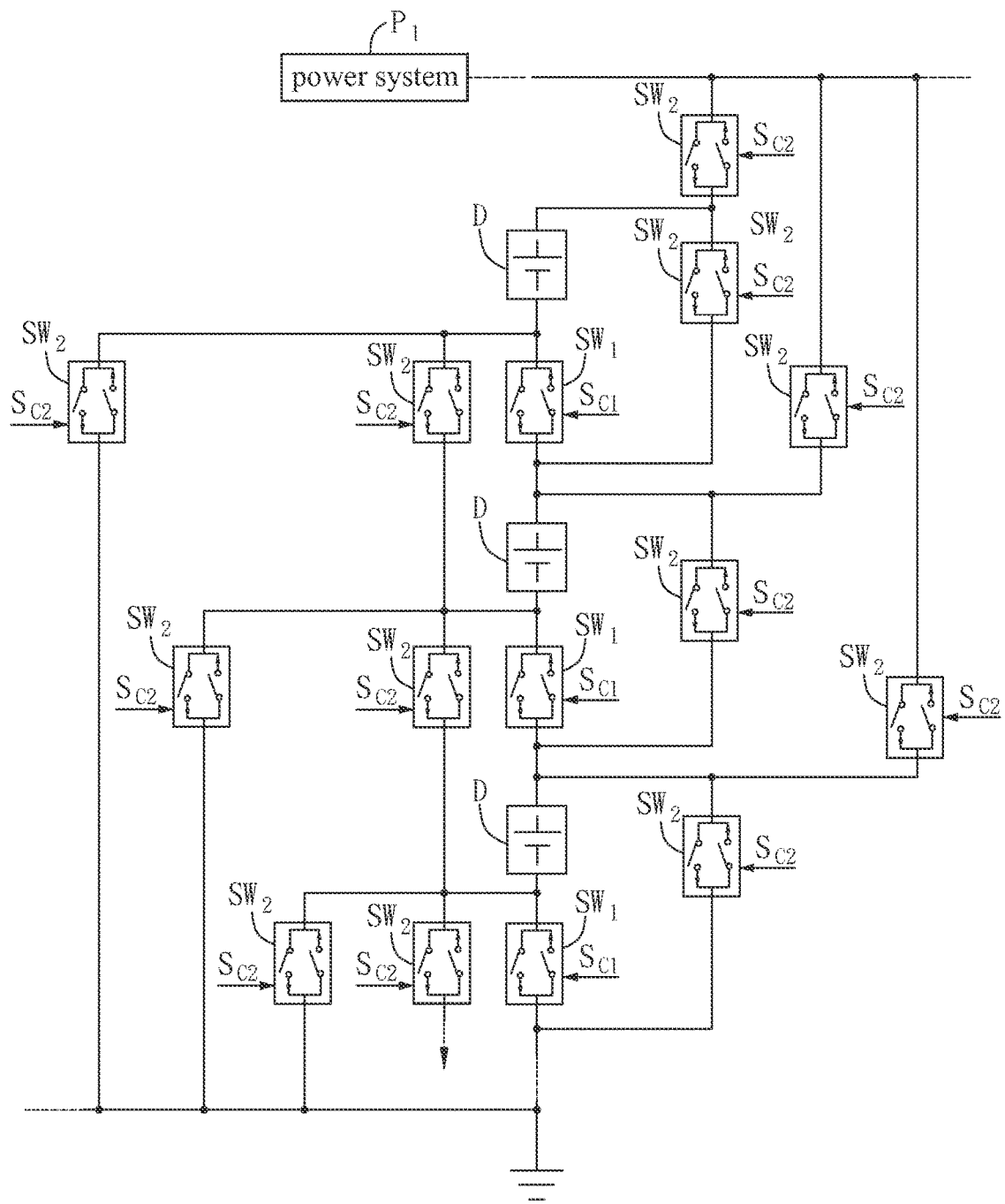
Figure 9I:
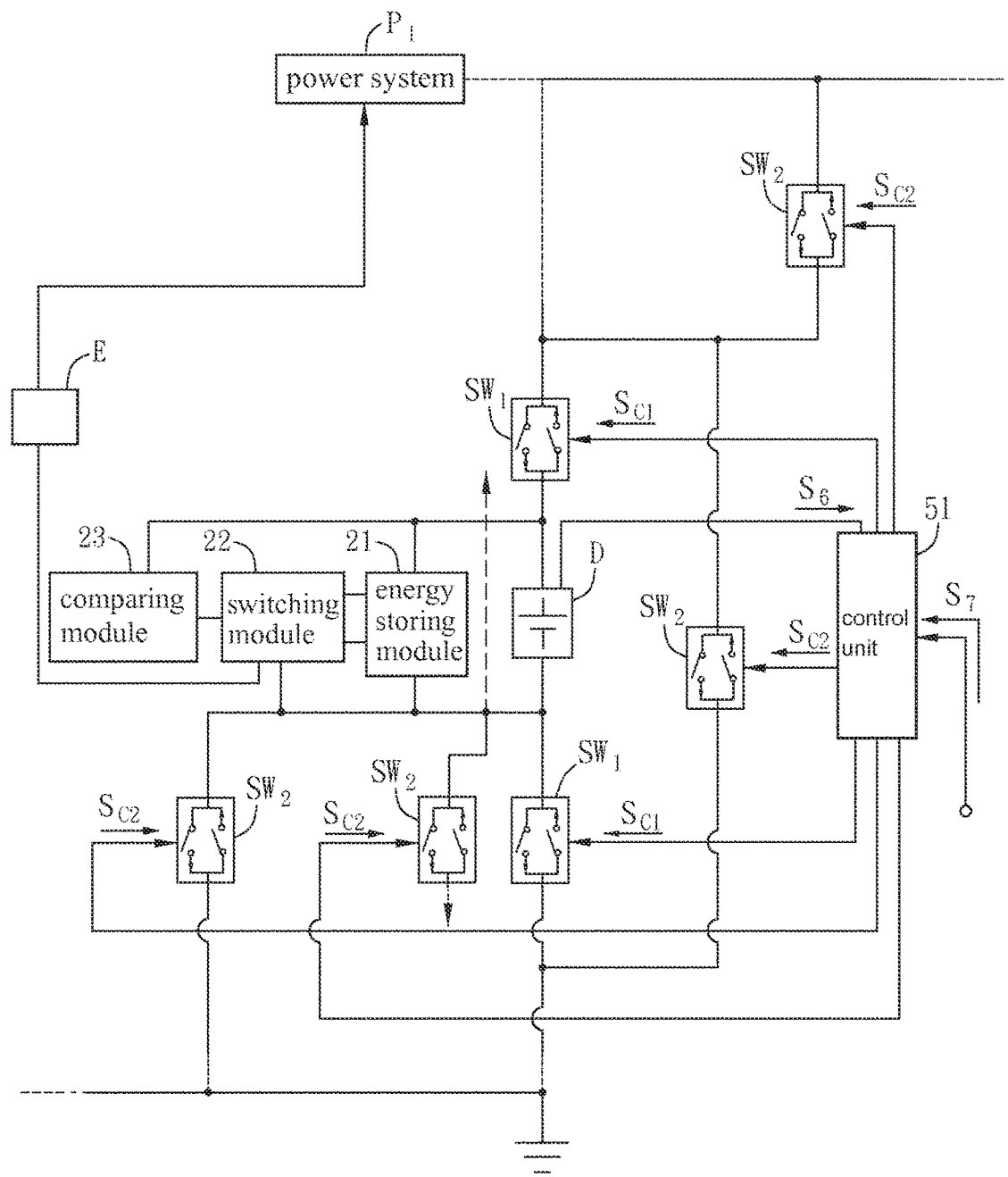

To be noted, the technical features of the above-mentioned switching units can be used separately or together according to the product requirement and design, as shown in FIGS. 9H and 9I. In FIG. 9H, the cooperation of a single first switching unit $SW_1$ with four second switching units $SW_2$ is shown. In this embodiment, when the second switching unit $SW_2$ connected to the power system $P_1$ of each stage of the power management apparatus and the second switching unit $SW_2$ connected to the grounding end of the power system $P_1$ are turned on and the other switching units are cut off, the controlled apparatuses D of all stages will become a parallel connection. In other words, the control unit (not shown) can output the second control signals $S_{C2}$ with different levels to the second switching units $SW_2$ to turn on and cut off different second switching units $SW_2$.

To emphasize the connection of the first and second switching units $SW_1$ and $SW_2$ in FIG. 9H, the energy storing module 21, the switching module 22, the comparing module 23 and the control unit 51 are not shown, but it doesn't mean the power management apparatus doesn't need the above-mentioned elements.

In FIG. 9I, the cooperation of two first switching units $SW_1$ with four second switching units $SW_2$ is shown. In this embodiment, the control unit 51 can adjust the connection pattern of the controlled apparatuses D by totally turning on or cutting off or partially turning on or cutting off the first switching units $SW_1$ and the second switching units $SW_2$. In other words, when there are over two first switching units $SW_1$ or second switching units $SW_2$, the control unit 51 can output the first control signals $S_{C1}$ with different levels to the first switching units $SW_1$ or output the second control signals $S_{C2}$ with different levels to the second switching units $SW_2$.

As an embodiment, the control unit 51 can determine which switching unit needs to be turned on or cut off by calculating the received controlled-apparatus-state signal $S_6$ or by comparing it with a predetermined value, or by using the control communication signal $S_7$, or by the calculation of a function, or by a look-up table.

Moreover, the first and second switching units $SW_1$ and $SW_2$ are semiconductor switching elements, and can include a charging control switch $SW_C$ and/or a discharging control switch $SW_D$. Accordingly, for controlling the first and second switching units $SW_1$ and $SW_2$, the first control signal $S_{C1}$ and the second control signal $S_{C2}$ will control the corresponding first switching unit $SW_1$ and the second switching unit $SW_2$ with a charging control signal $S_C$, a discharging control signal $S_D$, or their combination, respectively. The following is about four application constructions of the first switching unit $SW_1$ and the first control signal $S_{C1}$ as shown in FIGS. 10A to 10D by taking the first switching unit $SW_1$ and the first control signal $S_{C1}$ as an example.

Figure 10A:
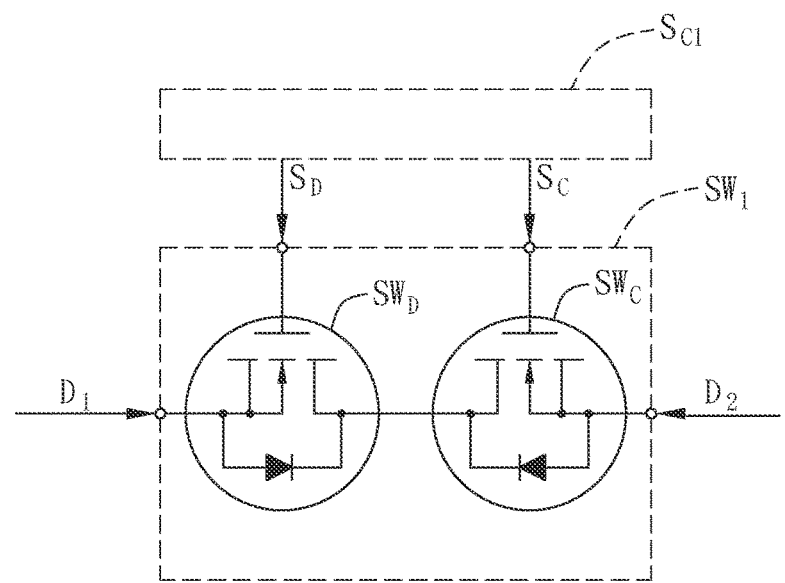
FIGS. 10A to 10D are schematic diagrams of some variations of the switching unit and the control signal according to an embodiment of the invention.

As shown in FIG. 10A, the first switching unit $SW_1$ includes the charging control switch $SW_C$ and the discharging control switch $SW_D$, and the charging control switch $SW_C$ is connected to the discharging control switch $SW_D$. The first switching unit $SW_1$ receives the charging control signal $S_C$ and the discharging control signal $S_D$ of the first charging control signal $S_{C1}$. The charging direction $D_1$ is from the discharging control switch $SW_D$ to the charging control switch $SW_C$, and the discharging direction $D_2$ is from the charging control switch $SW_C$ to the discharging control switch $SW_D$.

Figure 10B:
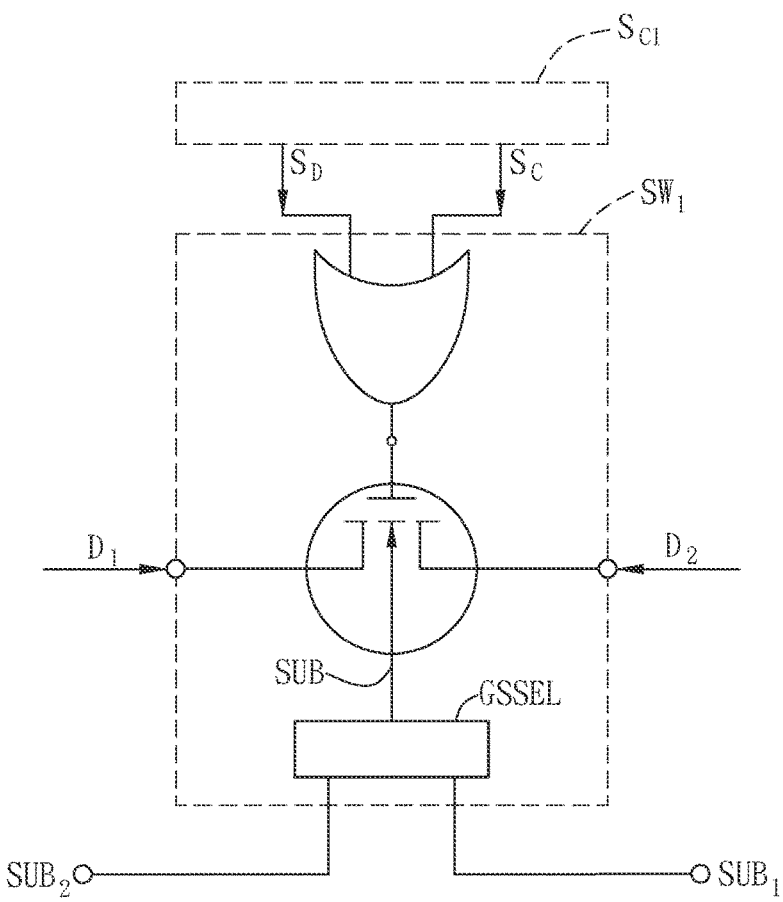
Figure 10C:
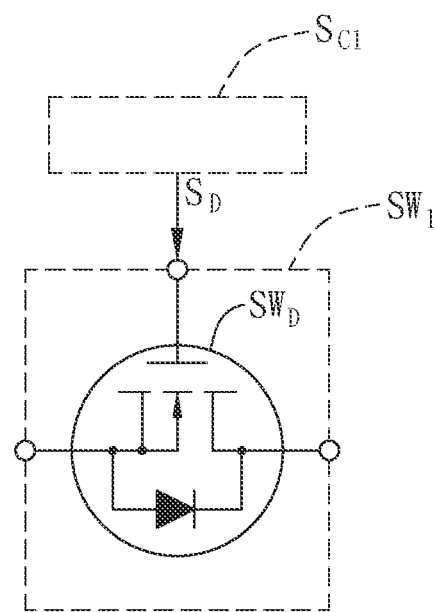
Figure 10D:
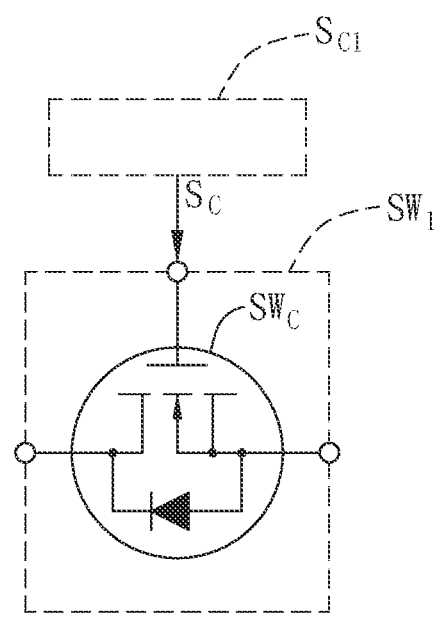

As shown in FIG. 10B, the first switching unit $SW_1$ includes an OR gate, a bidirectional transistor and a selection circuit GSSEL. The charging control signal $S_C$ and the discharging control signal $S_D$ of the first charging control signal $S_{C1}$ are received by the OR gate, and the selection circuit GSSEL switches the substrate SUB of the bidirectional transistor to the discharging grounding end $SUB_1$ or the charging grounding end $SUB_2$ according to the charging control signal $S_C$ and the discharging control signal $S_D$ for providing proper voltage for the substrate. As shown in FIG. 10C, the first switching unit $SW_1$ only includes a discharging control switch $SW_D$, and the first control signal $S_{C1}$, corresponding to the first switching unit $SW_1$, controls the first switching unit $SW_1$ by the discharging control signal $S_D$. As shown in FIG. 10D, the first switching unit $SW_1$ only includes a charging control switch $SW_C$, and the first control signal $S_{C1}$, corresponding to the first switching unit $SW_1$, controls the first switching unit $SW_1$ by the charging control signal $S_C$.

Summarily, in the power management apparatus of the invention, the comparing module generates a periodic signal to control the switching module according to the detection signal so that the energy storing module can store an energy during a cycle of the periodic signal and release the energy during other cycle. Thereby, the power management apparatus of the invention is capable of effectively protecting the controlled apparatus, avoiding the waste of the power, and storing and using the extra power.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power management apparatus arranged with a controlled apparatus and electrically connected to a power system, comprising:
   an energy storing module electrically connected to the controlled apparatus;
   a switching module electrically connected to the energy storing module; and
   a comparing module electrically connected to the switching module, receiving a detection signal, and generating a periodic signal to control the switching module according to the detection signal;
   wherein the energy storing module stores an electric energy during a cycle of the periodic signal and releases the electric energy during other cycle after said cycle;
   wherein the energy storing module includes a first connection end and a second connection end, the switching module includes an energy releasing end that is electrically connected to an external energy storing element, an external power, an external loading or the power system;
   wherein the energy storing module comprises:
   a first energy storing element, one end of which is electrically connected to the first connection end and the other end of which is connected to the switching module;
   a first rectifying element, which is electrically connected to the first energy storing element and the switching module; and
   a second energy storing element, which is electrically connected to the first rectifying element and the switching module;
   wherein the switching module comprises:
   a first switching element electrically connected to the first energy storing element and the second connection end; and
   a second switching element electrically connected to the second energy storing element and the energy releasing end.

2. The power management apparatus as recited in claim 1, wherein the detection signal is a current value or a voltage value representing the state of the controlled apparatus.

3. The power management apparatus as recited in claim 1, further comprising:
   a current detecting element electrically connected with the controlled apparatus in series between the first connection end and the second connection end and outputting the detection signal.

4. The power management apparatus as recited in claim 1, wherein the first energy storing element is an inductor and the second energy storing element is a capacitor.

5. The power management apparatus as recited in claim 1, wherein the second energy storing element is electrically connected to the second connection end.

6. The power management apparatus as recited in claim 1, wherein each cycle of the periodic signal includes a turn-on period and a cut-off period.

7. The power management apparatus as recited in claim 6, wherein electric energy is stored through the first switching element during the turn-on period of at least one cycle of the periodic signal, and released through the first rectifying element and stored by the second energy storing element during the cut-off period of said cycle, and then released through the second switching element during the turn-on period of other cycle after said cycle.

8. The power management apparatus as recited in claim 1, wherein each of the first and second switching elements is a semiconductor switching element.

9. The power management apparatus as recited in claim 1, wherein the first energy storing element and the first switching element form an energy storing path, and the second energy storing element and the second switching element form an energy releasing path.

10. The power management apparatus as recited in claim 1, wherein the energy storing module further comprises:
a second rectifying element, one end of which is electrically connected to the second energy storing element and the other end of which is electrically connected to the second connection end; and
a third rectifying element, one end of which is electrically connected to the second energy storing element and the other end of which is electrically connected to the external energy storing element, the external power, the external loading or the power system.

11. The power management apparatus as recited in claim 10, wherein the first energy storing element and the first rectifying element form an energy releasing path, and the second energy storing element and the second rectifying element form an energy storing path.

12. The power management apparatus as recited in claim 10, wherein the third rectifying element, the second energy storing element and the second switching element form an energy releasing path.

13. The power management apparatus as recited in claim 1, wherein the comparing module comprises:
a comparator electrically connected to the first switching element, and outputting the periodic signal to control the first switching element or the second switching element according to the detection signal and a reference signal.

14. The power management apparatus as recited in claim 13, wherein the reference signal is a voltage signal or a sawtooth-wave voltage signal related to the characteristics of the controlled apparatus.

15. The power management apparatus as recited in claim 1, wherein the comparing module comprises:
a digital control circuit electrically connected to the first switching element, converting the detection signal into a digital signal, and comparing the digital signal with a predetermined value to output the periodic signal to control the first or the second switching element according to the comparing result.

16. The power management apparatus as recited in claim 15, wherein the digital control circuit is a microcontroller.

17. The power management apparatus as recited in claim 15, wherein the digital control circuit has a data communication signal to communicate with the power system.

18. The power management apparatus as recited in claim 17, wherein the digital control circuit further includes an environment-state signal input end, which is connected to an external environment detector and receives an environment-state signal including environment temperature or humidity information related to the controlled apparatus.

19. The power management apparatus as recited in claim 18, wherein the external environment detector is a thermistor.

20. The power management apparatus as recited in claim 18, wherein the data communication signal includes an operation information of the power management apparatus, and the operation information includes voltage value, current value, voltage variation or current variation detected by the detection signal, or frequency, or duration of the turn-on period, or duration of the cut-off period of the periodic signal, or environment parameters detected by the environment-state signal, or the data information derived from the above parameters.

21. The power management apparatus as recited in claim 1, further comprising:
at least one first switching unit forming a series circuit by connecting with the controlled apparatus in series;
at least one second switching unit electrically connected to the series circuit and providing a charging path or a discharging path when the first switching unit is cut off; and
a control unit electrically connected to the controlled apparatus, the first switching unit and the second switching unit, and outputting a first control signal to the first switching unit or outputting a second control signal to the second switching unit according to a controlled-apparatus-state signal or a control communication signal.

22. The power management apparatus as recited in claim 21, wherein the second switching unit is electrically connected to the controlled apparatus, or to the power system, or to the grounding end of the power system, or to another controlled apparatus.

23. The power management apparatus as recited in claim 21, wherein each of the first control signal and the second control signal includes a charging control signal, or a discharging control signal, or their combination.

24. The power management apparatus as recited in claim 21, wherein each of the first and second switching units is a semiconductor switching element.

25. The power management apparatus as recited in claim 21, wherein the controlled-apparatus-state signal is a current value or a voltage value representing the discharging state or charging state of the controlled apparatus.

26. The power management apparatus as recited in claim 21, wherein the control unit determines whether the controlled apparatus is chargeable or dischargeable according to the controlled-apparatus-state signal, when the determination result is negative, the first control signal is outputted to cut off the first switching unit and the second control signal is outputted to turn on the second switching unit.

27. The power management apparatus as recited in claim 21, wherein the control unit is a comparator, which compares the controlled-apparatus-state signal with a predetermined value and outputs the first control signal or the second control signal according to the comparing result.

28. The power management apparatus as recited in claim 21, wherein when there are a plurality of the first switching units or second switching units, the control unit outputs the first control signals with different levels to the first switching unit or outputs the second control signals with different levels to the second switching unit.

29. The power management apparatus as recited in claim 21, wherein the control unit is a digital control circuit, converts the controlled-apparatus-state signal into a digital signal, and compares the digital signal with a predetermined value to output the first control signal or second control signal according to the comparing result.

30. The power management apparatus as recited in claim 29, wherein the digital control circuit is a microcontroller.

31. The power management apparatus as recited in claim 29, wherein the digital control circuit has a control communication signal end and receives the control communication signal.

32. The power management apparatus as recited in claim 29, wherein the digital control circuit has an environment-state signal input end, which is connected to an external environment detector, and the environment-state signal includes environment temperature or humidity information related to the controlled apparatus.

33. The power management apparatus as recited in claim 32, wherein the external environment detector is a thermistor.

34. The power management apparatus as recited in claim 32, wherein the control communication signal includes an operation information of the power management apparatus, and the operation information includes a voltage value, current value, voltage variation or current variation detected by the controlled-apparatus-state signal, or environment parameters detected by the environment-state signal, or the data information derived from the above parameters, or the state information of the first or second control signal, or the remotely inputted information for controlling the first control signal or the second control signal.

35. The power management apparatus as recited in claim 21, wherein the control unit is a signal converter, which receives the control communication signal and outputs the first control signal or the second control signal.

36. The power management apparatus as recited in claim 1, wherein the controlled apparatus includes a loading, or a secondary battery, or a light emitting diode, or an electric double-layer capacitor, or a photovoltaic cell or an assembly capable of storing energy and discharging, each of which requires current or voltage protection or control.

37. The power management apparatus as recited in claim 1, wherein the power system further comprises:
a current source electrically connected to the controlled apparatus and the energy storing module; and
a rectifying element connected to the current source in parallel.

38. A power management apparatus arranged with a controlled apparatus and electrically connected to a power system, comprising:
an energy storing module electrically connected to the controlled apparatus;
a switching module electrically connected to the energy storing module;
a comparing module electrically connected to the switching module, receiving a detection signal, and generating a periodic signal to control the switching module according to the detection signal;
at least one first switching unit forming a series circuit by connecting with the controlled apparatus in series;
at least one second switching unit electrically connected to the series circuit and providing a charging path or a discharging path when the first switching unit is cut off; and
a control unit electrically connected to the controlled apparatus, the first switching unit and the second switching unit, and outputting a first control signal to the first switching unit or outputting a second control signal to the second switching unit according to a controlled-apparatus-state signal or a control communication signal;
wherein the energy storing module stores an electric energy during a cycle of the periodic signal and releases the electric energy during other cycle after said cycle.

* * * * *